United States Patent
Gotou et al.

(10) Patent No.: US 6,926,352 B2
(45) Date of Patent: Aug. 9, 2005

(54) VEHICLE BODY STRUCTURE

(75) Inventors: Takeshi Gotou, Wako (JP); Shigeto Yasuhara, Wako (JP); Hitoshi Katou, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/962,695

(22) Filed: Oct. 12, 2004

(65) Prior Publication Data

US 2005/0082877 A1 Apr. 21, 2005

(30) Foreign Application Priority Data

Oct. 16, 2003 (JP) ........................................ 2003-356981

(51) Int. Cl.$^7$ .............................................. B62D 25/20
(52) U.S. Cl. .................. 296/204; 296/209; 296/187.08; 296/193.08
(58) Field of Search ....................... 296/187.01, 187.03, 296/187.08, 187.09, 187.12, 193.01, 193.07, 193.09, 203.01, 203.02, 204, 209, 203.03; 280/781, 784

(56) References Cited

U.S. PATENT DOCUMENTS

| | | | | |
|---|---|---|---|---|
| 3,108,836 A | * | 10/1963 | Deckert | 296/204 |
| 4,129,330 A | * | 12/1978 | Schwuchow | 296/204 |
| 4,557,519 A | * | 12/1985 | Matsuura | 296/204 |
| 4,824,166 A | * | 4/1989 | Denker et al. | 296/204 |
| 5,048,888 A | * | 9/1991 | Willy et al. | 296/187.03 |
| 5,074,587 A | * | 12/1991 | Schwede et al. | 280/781 |

FOREIGN PATENT DOCUMENTS

JP           07-187019           7/1995

* cited by examiner

Primary Examiner—Patricia L. Engle
(74) Attorney, Agent, or Firm—Rankin, Hill, Porter & Clark LLP

(57) ABSTRACT

A vehicle body 10 includes right and left floor frames 16 and right and left side sills 13, all extending in a longitudinal direction of the vehicle body, are disposed in parallel with each other, and right and left front side frames 11 extend forward from front ends of the right and left floor frames 16. Rear end sections 75 are butted to the side sills 13 such that the rear end sections approach the side sills 13, and are joined to the side sills 13 at longitudinal midpoints of the side sills 13. A cross member 22 spans across the right and left side sills 13 at positions forward of the joint sections and in the vicinity of the joint sections. A joint section 85 at the side sill 13, the floor frame 16, and the cross member 22 is formed into a substantially triangular shape in plan view.

12 Claims, 18 Drawing Sheets

VEHICLE BODY STRUCTURE

BACKGROUND OF THE INVENTION

The present invention relates to a vehicle body structure which is capable of effectively dissipating impact energy throughout the entire vehicle body.

Techniques for enhancing the ability of a vehicle, such as an automobile, to absorb impact energy by dissipating impact energy acting on a vehicle body are under development (see, e.g., Patent Document 1).

[Patent Document 1]
JP-A-7-187019 (FIGS. 1 to 3)

Patent Document 1 will be described by reference to the drawing.

FIG. 19 shows a schematic view of a conventional vehicle body structure. A conventional vehicle body 200 is configured as follows. Right and left side frames 201 (for the sake of simplicity, only one of these is shown; the same applies hereinafter) extending in a longitudinal direction of a vehicle body are disposed on a front portion of the vehicle body. Right and left side sills 202 extending in the longitudinal direction of the vehicle are disposed on a center portion of the vehicle body. A front end portion of an extension member 203 is joined to a rear portion of the front side frame 201. When viewed from the top, the extension member 203 has an expansion section 204 which is substantially L-shaped with its rear portion spread to a large extent. A rear side portion of the L-shape is joined to an inner side of a front portion of the side sill 202. A floor panel 205 is located on the expansion section 204. The expansion section 204 has a plurality of reinforcement beads 206. Reference numeral 207 denotes a lower dash panel separating an engine compartment in the front portion of the vehicle body from a cabin in the center portion of the vehicle body. Reference numeral 208 denotes a wheel well for a front wheel.

Impact energy En exerted on the front of the vehicle body 200 is transmitted from the front side frame 201 to the extension member 203, is further transmitted from the rear portion of the extension member 203 to the front portion of the side sill 202, and is transmitted from the expansion section 204 to the floor panel 205. As described above, the impact energy En from the front can be dissipated throughout the vehicle body 200.

Meanwhile, the impact energy which may act on the vehicle body 200 includes not only impact energy En acting from the front but also impact energy acting from the side of the vehicle body. However, dissipation of the impact energy acting from the side has not been considered in the design of the conventional vehicle body 200. Effective dissipation of both impact energy from the front of the vehicle body and that from the side of the same throughout the entire vehicle body 200 still has room for improvement.

SUMMARY OF THE INVENTION

The present invention aims at providing a technique capable of effectively dissipating throughout an entire vehicle body both impact energy from the front of the vehicle body and impact energy from the side of the same.

According to an aspect of the invention, there is provided a vehicle body structure including right and left floor frames, and right and left side sills, all extending in parallel with each other in a longitudinal direction of a vehicle body, the floor frames being located between a longitudinal centerline of the vehicle and the respective side sills; right and left front side frames extending forward from front ends of the right and left floor frames; a cross member; wherein a joint section at the left side sill, the left floor frame, and a cross member is formed into a substantially triangular shape in plan view; and a joint section at the right side sill, the right floor frame, and a cross member is formed into a substantially triangular shape in plan view, rear end sections of the right and left floor frames are butted to the right and left side sills in such a manner that the rear end sections of the floor frames approach the side sills to be joined to the side sills at longitudinal midpoints of the right and left side sills, and the cross member spans across the right and left side sills at positions which are forward of the joint sections and in the vicinity of the joint sections.

In addition, the vehicle body structure includes a joint section constituted of the right side sill, the right floor frame, and the cross member, which is formed into a substantially triangular shape in plan view.

According to the first aspect of the invention, on each of the right and left sides, the joint section constituted of the side sill, the floor frame, and the cross member is configured into a joint structure of substantially triangular shape in plan view; in other words, into a triangular joint section. By virtue of being configured into the triangular joint section, the side sill, the floor frame, and the cross member are capable of complementing each other in terms of strength and rigidity.

Impact energy acting from the front of the vehicle body can be transmitted from the front side frame to the triangular joint section by way of the floor frame; and further, the impact energy can be effectively dissipated from the triangular joint section to the cross member and the side sill.

In addition, impact energy acting from the side of the vehicle body can be transmitted from the side sill to the triangular joint section; and further, the impact energy can be effectively dissipated from the triangular joint section to the floor frame and the cross member.

As described above, both impact energy from the front of the vehicle body and impact energy from the side of the same can be effectively dissipated throughout the entire vehicle body. As a result, impact energy can be sufficiently absorbed by the entire vehicle body; accordingly, the impact-energy-absorbing ability of the vehicle body can be enhanced. In addition, members of the vehicle body do not have to be upsized, and novel reinforcement members do not have to be provided for the purpose of reinforcement of the members. Consequently, vehicle body weight can be suppressed, and sufficient space can be ensured within the cabin.

During running, vibrations from the front wheels are transmitted to the floor frame by way of the front portion of the vehicle body. The vibrations primarily act in a direction for distorting the floor frame.

To this end, according to claim 1, the cross member spans across the right and left side sills at positions forward of the joint sections between the side sills and the rear end sections of the floor frames, and the floor frames are also joined to the cross member. Accordingly, the floor frame can be shortened in length. Furthermore, the rear end sections of the floor frames are joined by the robust triangular joint sections. Therefore, vibrations in the distorting direction on the floor frame can be reduced.

DETAILED DESCRIPTION OF THE PREFERRED EMBODIMENTS

Figure 1:
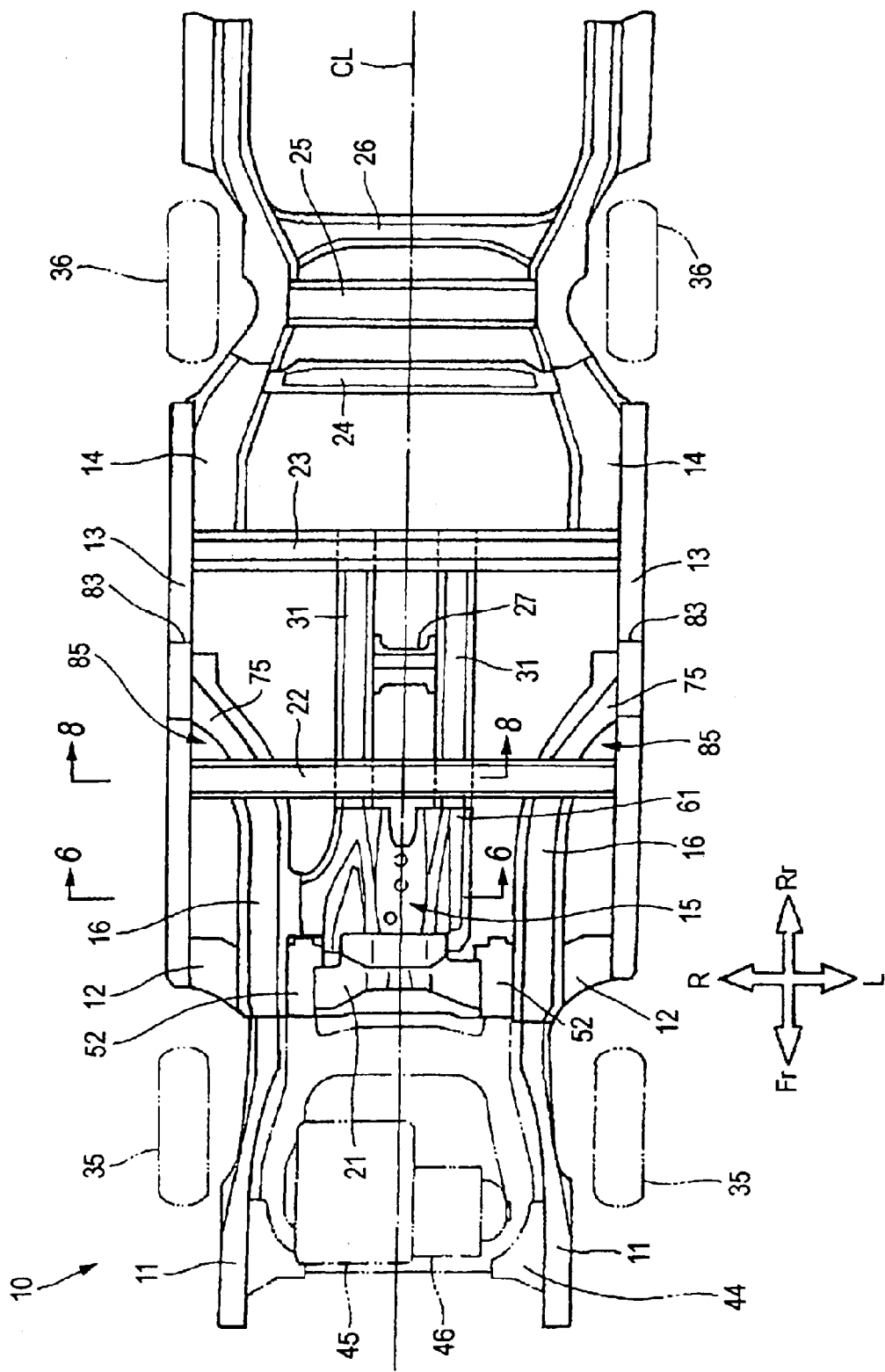
FIG. 1 is a plan view of a vehicle body according to the present invention.

An embodiment of the present invention will now be described by reference to the drawings. In the following, the expressions "front," "rear," "left," "right," "upper," and "lower" relate to a driver's view; and "Fr" denotes a front side, "Rr" denotes a rear side, "L" denotes a left side, "RL" denotes a right side, and "CL" denotes a longitudinal centerline (i.e., a centerline of vehicle body). When applicable, a drawing is assumed to be viewed from a direction indicated by the corresponding reference numeral in a related figure.

FIG. 1 is a plan view showing a vehicle body according to the invention. FIG. 1 shows a vehicle body 10 from which a floor panel is omitted; however, for convenience of explanation, only a floor tunnel 15 is shown.

The vehicle body 10 is a low-deck body in which a floor panel is lowered in height. Principle configuration members of the vehicle body 10 include: right and left front side frames 11, 11 extending in a longitudinal direction of the vehicle body; right and left side outriggers 12, 12 joined to rear side portions of the front side frames 11, 11; right and left side sills 13, 13 extending rearward from rear portions of the side outriggers 12, 12; right and left rear side frames 14, 14 extending rearward from rear portions of the side sills 13, 13; the floor tunnel 15 extending in the longitudinal direction of the vehicle body along the longitudinal centerline (i.e., a longitudinal centerline) CL; floor frames 16, 16 extending in the longitudinal direction of the vehicle body on the right and left sides of the floor tunnel 15; and six cross members 21 to 26 extending in a lateral direction of the vehicle.

The six cross members 21 to 26 are arranged from the front to the rear of the vehicle body in the order of a first cross member 21, a second cross member 22, a third cross member 23, a fourth cross member 24, a fifth cross member 25, and a sixth cross member 26.

The first cross member 21 will be described later. The second and third cross members 22, 23 are members spanning across the right and left side sills 13, 13 at positions rearward of the floor tunnel 15. The fourth, fifth, and sixth cross members 24 to 26 are members spanning across the right and left rear side frames 14, 14.

Meanwhile, the floor tunnel 15 is generally an elongated member extending to the third cross member 23. However, in the invention, a front engine front wheel drive (FF) method is employed as a power transmission method of the vehicle. Accordingly, a drive shaft does not necessarily pass through the floor tunnel 15. However, since various devices are disposed in the vicinity of a front half of the floor tunnel 15, the floor tunnel 15 cannot be completely removed. Meanwhile, the vertical height of a rear half of the floor tunnel 15 can be lowered. When the height is lowered, a cabin space can be expanded, thereby enhancing comfort.

For the above reasons, in the invention, the floor tunnel 15 is shortened in length so as to extend rearward to a position frontward of the second cross member 22, and center frames 31, 31 located at a lower level are employed rearward of the floor tunnel 15.

More specifically, rear end sections 61 of the short floor tunnel 15 are joined to the second cross member 22 and the third cross member 23 via a pair of right and left center frames 31, 31. The center frames 31, 31 are members arranged on the right and left sides of the longitudinal centerline CL and extending in the longitudinal direction of the vehicle body. Reference numeral 27 denotes a seventh cross member spanning across the right and left center frames 31, 31. Meanwhile, the above configuration may be modified such that the rear end sections 61 are joined directly to the second cross member 22.

The right and left front side frames 11, 11 can be said to be members extending forward from the front ends of the right and left floor frames 16, 16.

As described above, the floor frames 16, 16 extending in the longitudinal direction of the vehicle body and the side sills 13, 13 extending in the same direction can be disposed in parallel to each other, with the floor frames 16, 16 being located between the centerline of vehicle width CL and the respective side sills 13, 13.

In the drawing, 35, 35 denote right and left front wheels, and 36, 36 denote right and left rear wheels.

Figure 2:
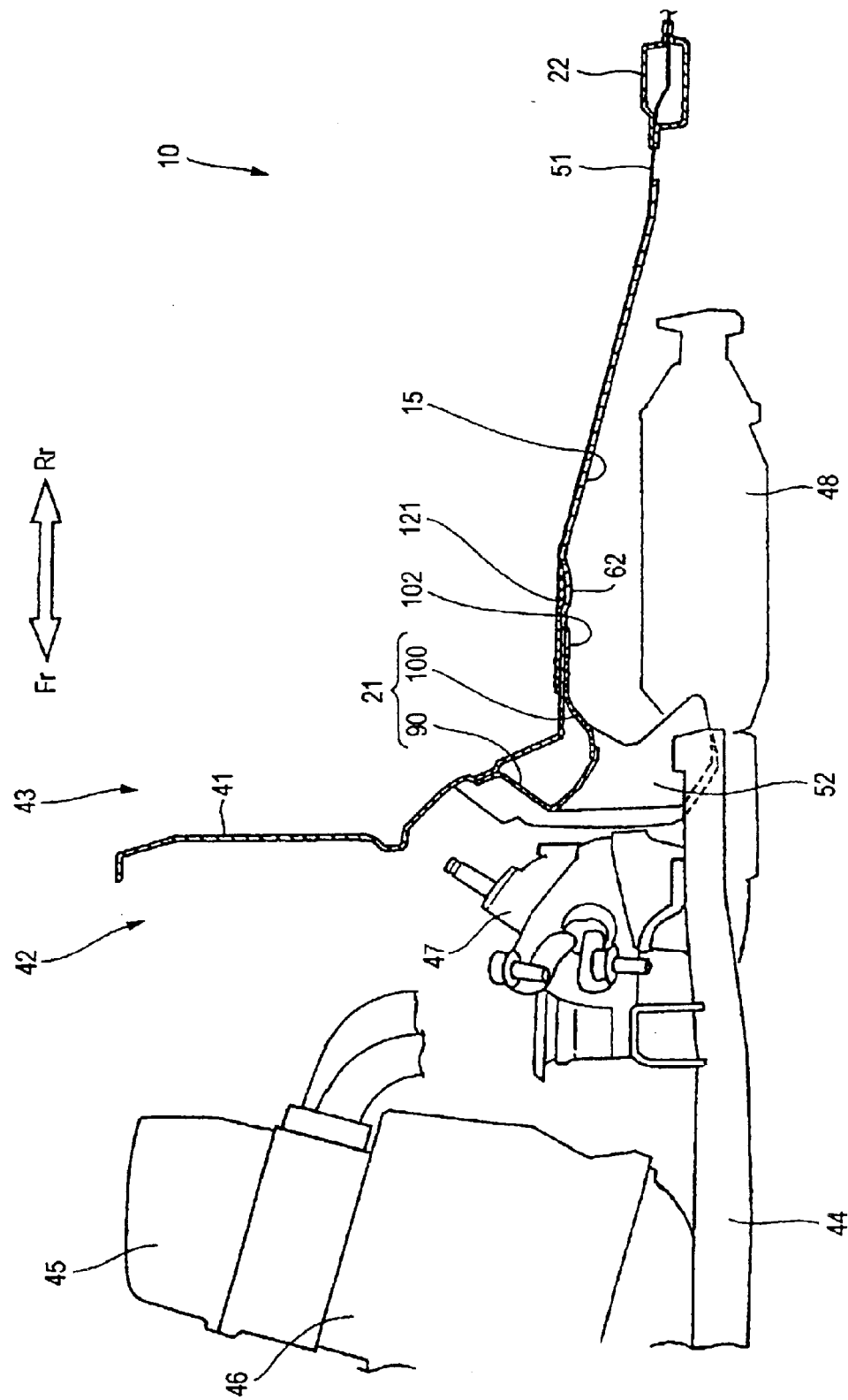
FIG. 2 is a cross-sectional view of a front section, and the vicinity thereof, of a floor tunnel of the vehicle body according to the invention when viewed from the left.

FIG. 2 is a cross-sectional view showing a front section and its vicinity of the floor tunnel 15 of the vehicle body according to the invention when viewed from the left.

As shown in FIG. 2, the vehicle body 10 is configured as follows. The front portion of the vehicle body 10 is divided into an engine compartment 42 in the front and a cabin 43 in the rear, by a dashboard 41. An engine-mounting subframe 44 is detachably installed on the to the right and left front side frames 11, 11 (see FIG. 1) extending in the longitudinal direction of the vehicle body in the engine compartment 42. The engine-mounting sub-frame 44 is a member on which an engine 45, a transmission 46, and a steering device 47 are mounted. The first cross member 21 is disposed in a lower section of a portion of the dashboard 41. Reference numeral 48 denotes an engine exhaust muffler.

Figure 3:
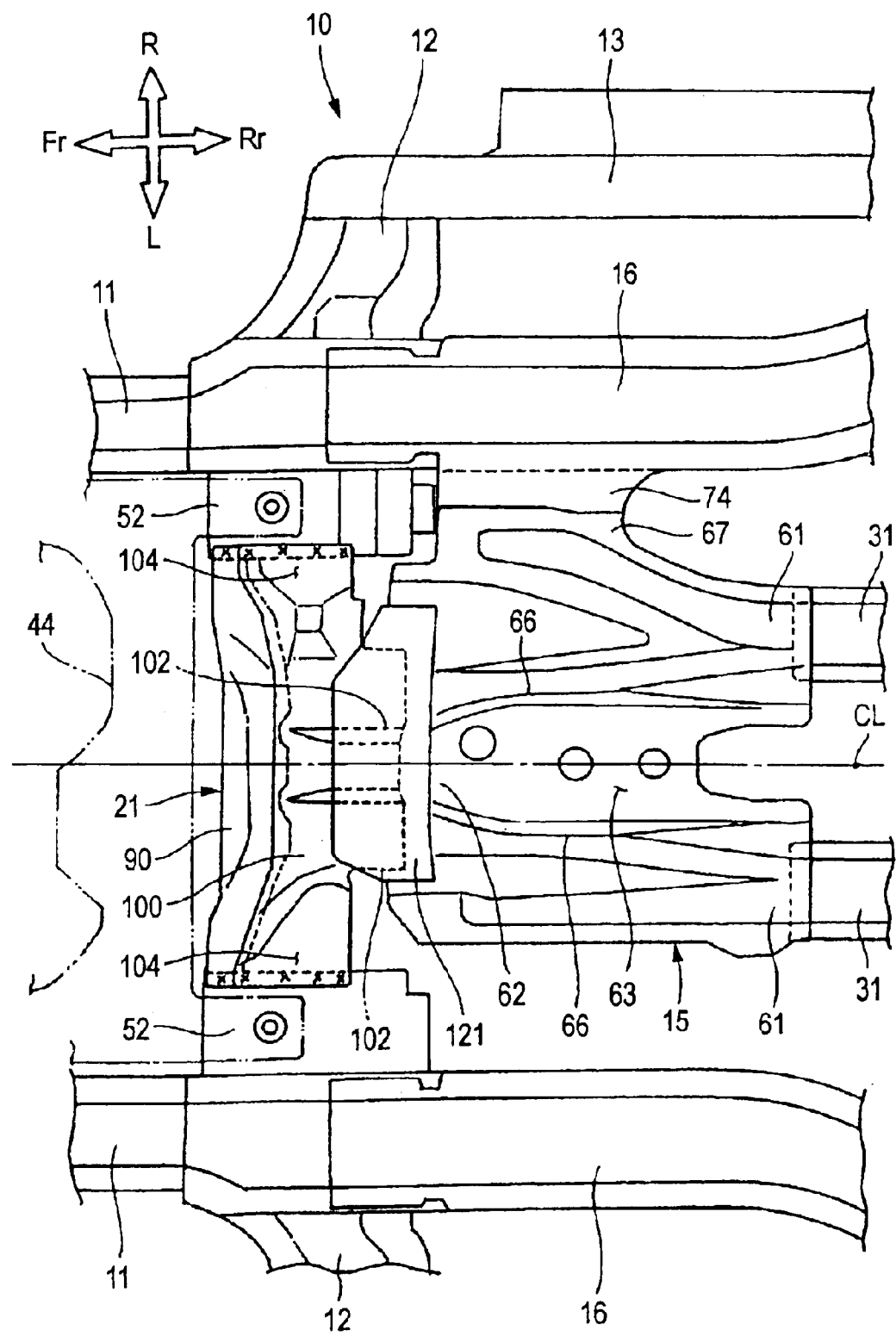
FIG. 3 is a plan view of the front section, and the vicinity thereof, of the floor tunnel of the vehicle body according to the invention.
Figure 4:
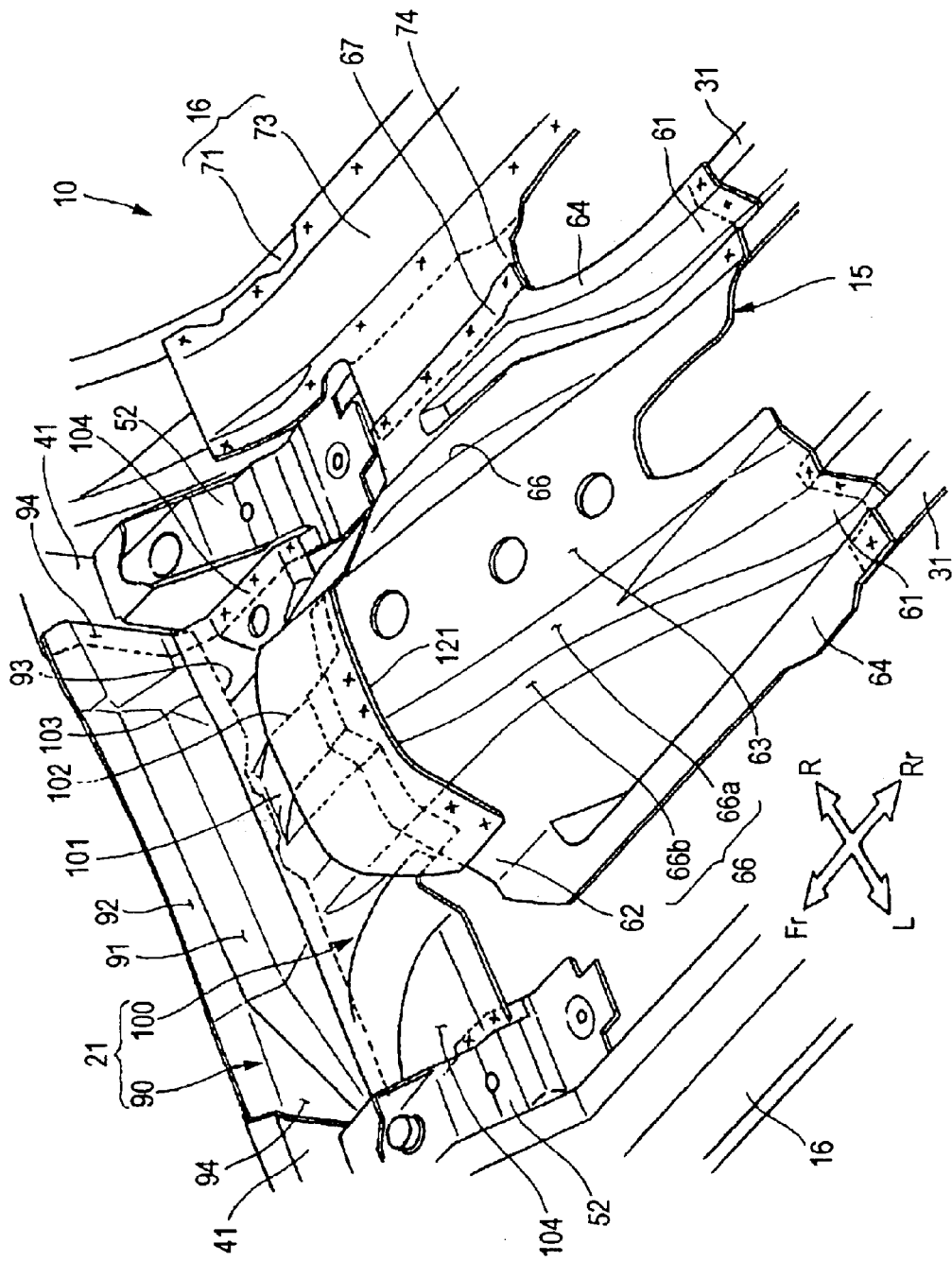
FIG. 4 is a perspective view of the front section, and the vicinity thereof, of the floor tunnel of the vehicle body according to the invention when viewed from the upper left.
Figure 5:
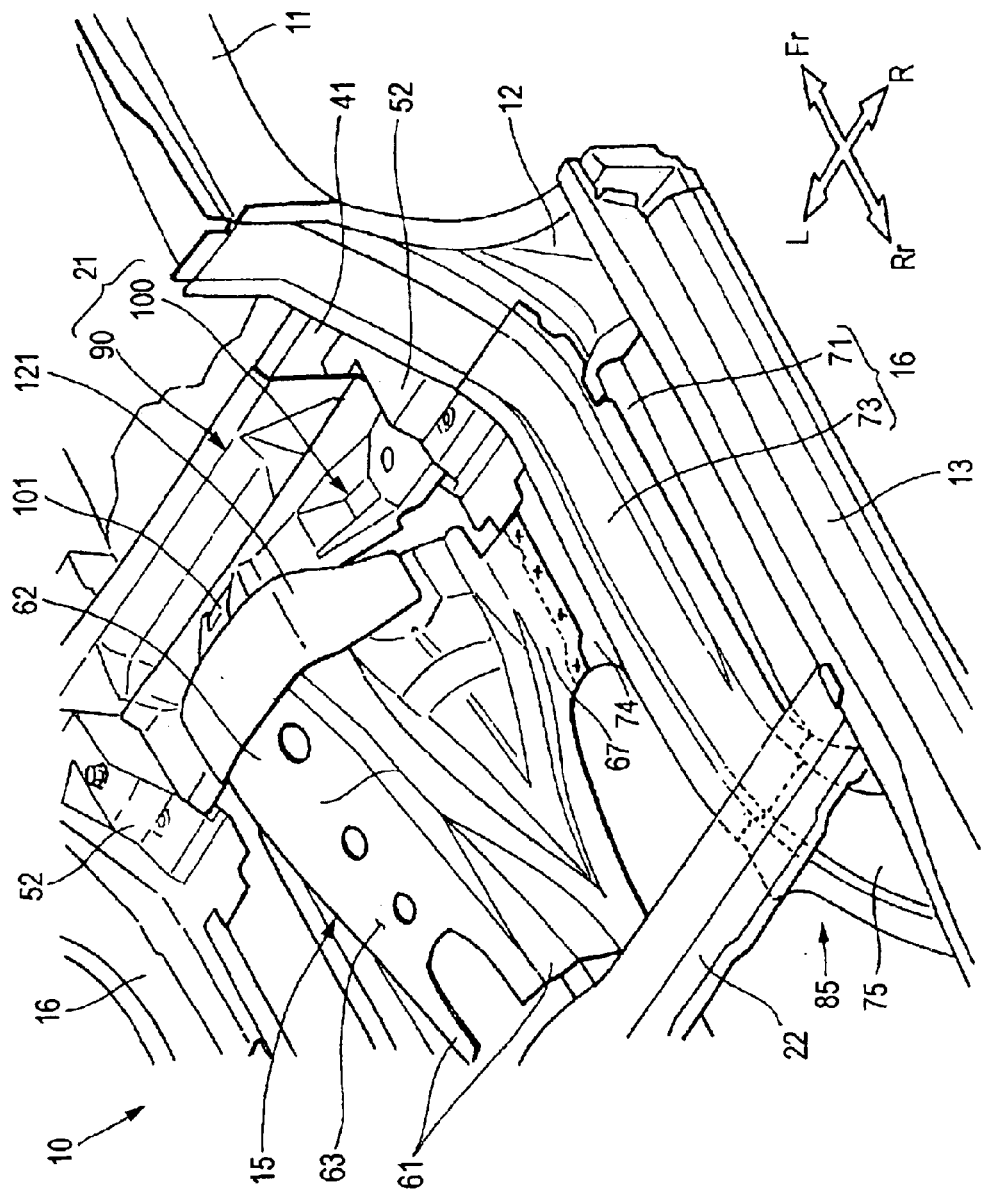
FIG. 5 is a perspective view of the front section, and the vicinity thereof, of the floor tunnel of the vehicle body according to the invention when viewed from the upper right.
Figure 6:
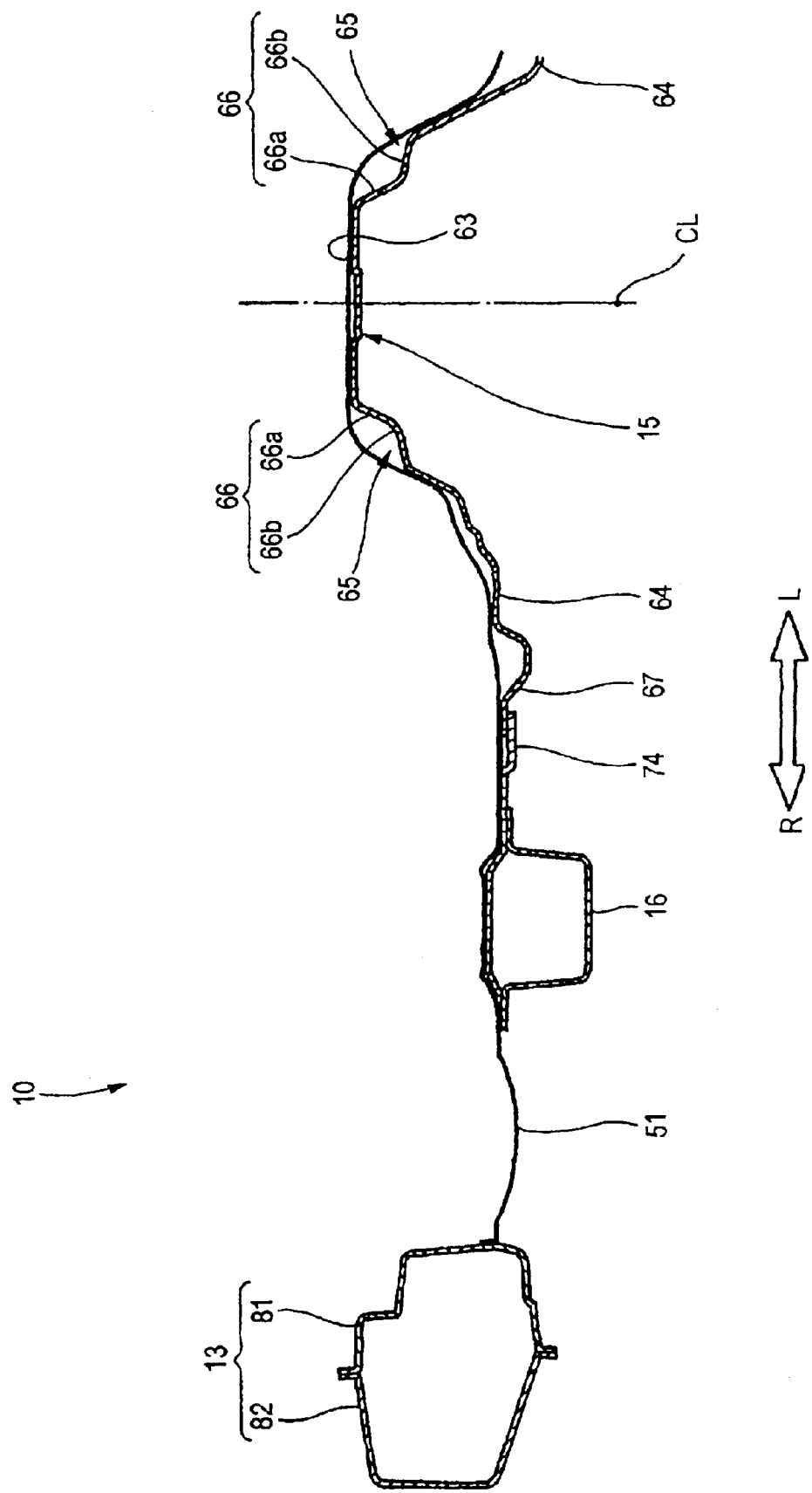
FIG. 6 is a cross-sectional view taken along line 6—6 in FIG. 1.

FIG. 3 is a plan view showing the front section and its vicinity of the floor tunnel 15 of the vehicle body according to the invention, from which the dashboard is omitted. FIG. 4 is a perspective view showing the front section and its vicinity of the floor tunnel 15 according to the invention when viewed from the upper left. FIG. 5 is a perspective view showing the front section and its vicinity of the floor tunnel 15 according to the invention when viewed from the upper right. FIG. 6 is a cross-sectional view along line 6—6 in FIG. 1 (however, the drawing shows a state where a floor panel 51 is disposed).

As shown in FIG. 3, the right and left front side frames 11, 11 have brackets 52, 52, respectively, at inner sides of rear end portions thereof. The engine-mounting sub-frame 44 can be attached onto the front side frames 11, 11 by detachably attaching rear ends of the engine-mounting subframe 44, which are indicated with imaginary lines, to the bracket 52, 52.

As shown in FIGS. 3 to 5, the floor tunnel 15 is of a so-called substantially streamlined shape, in which the height and width are gradually reduced from the front end section 62 rearward. More specifically, the floor tunnel 15 is formed so as to be substantially rectangular in plan view, in which an upper surface 63 is tilted so as to exhibit a rearward descending grade from the front end section 62.

More specifically, as shown in FIG. 6, the floor tunnel 15 is a bent-work product made from plate material, and has a substantially inverted U-shaped cross-section when viewed from the front. The floor tunnel 15 includes horizontal flanges 64, 64 extending from the right and left sides of the floor tunnel 15 toward the respective opposing side sills 13, 13. The thickness of the floor tunnel 15 is greater than that of the floor panel 51.

As shown in FIG. 6, the floor panel 51 is a thin plate configured such that the floor panel 51 is lap-joined onto the right and left floor frames 16, 16 (only one of which is shown in the drawing) and the floor tunnel 15, and is also joined to the right and left side sills 13, 13 (only one of which is shown in the drawing). As described above, the floor panel 51 can be connected to the floor tunnel 15. The floor tunnel 15 is located at a higher level in relation to a floor surface of the floor panel 51.

As shown in FIGS. 3 to 6, the floor tunnel 15; that is, the inverted U-shaped cross-sectional body 15, includes right and left stepped sections 66, 66 which are formed by forming right and left upper corners 65, 65 (see FIG. 6) into one-stage lowered steps. The stepped section 66 is constituted of a drooping section 66a extending downward from the upper surface 63, and a stepped surface section 66b extending laterally from the lower end of the drooping section 66a. Since the stepped sections 66, 66 descend along the upper surface 63 downwardly rearward, the stepped surface sections 66b, 66b also descend downwardly rearward. As a result, rear ends of the stepped surface sections 66b, 66b coincide with the flanges 64, 64.

As shown in FIGS. 3 and 4, the rear end section 61 of the floor tunnel 15 is laterally bifurcated, and tips of the right and left center frames 31, 31 are joined to the thus-bifurcated sections by spot welding, or the like. The center frames 31, 31 are elongated beams of substantially trough shape (or channel shape).

Next, joint relationships between the right and left floor frames 16, 16 and the floor tunnel 15 will be described.

Figure 7:
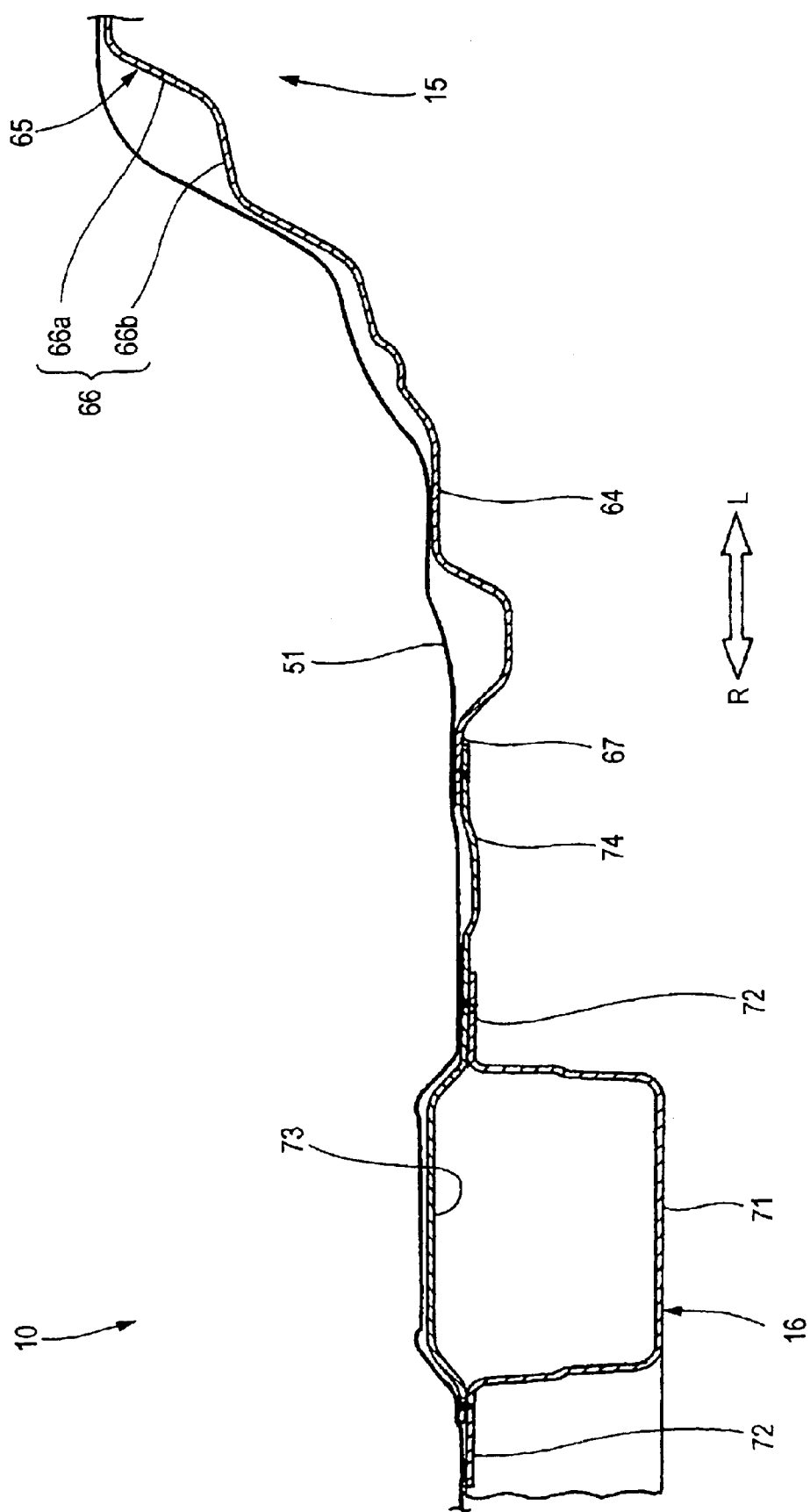
FIG. 7 is an enlarged view of essential portions, and the vicinities thereof, of a right floor frame and a right floor tunnel shown in FIG. 6.

FIG. 7 is an enlarged view of essential portions and their vicinities of the right floor frame 16 and the right side of the floor tunnel 15 shown in FIG. 6, wherein a relationship between the floor frame 16 and the floor tunnel 15 is shown.

The right floor frame 16 is a beam which is constructed into a closed cross-sectional structure by covering a cover section 73 of substantially plate shape onto a frame main body 71—which is open-topped when viewed from the front and substantially U-shaped—and joining the frame main body 71 and the cover section 73 by spot welding, or the like. The frame main body 71 has flanges 72, 72 extending laterally from the upper end thereof.

The right floor frame 16; that is, the frame main body 71 and the cover section 73, are bent-work products made from plate materials. The frame main body 71 and the cover section 73 are greater in thickness than the floor panel 51.

As shown in FIGS. 4, 5, and 7, the floor frame 16 is configured such that a portion of a substantially horizontal portion of the plate material constituting the floor frame 16; for instance, a portion of the cover section 73, extends toward the floor tunnel 15, and the thus-extending portion is formed into an extending section 74 of the frame side.

Meanwhile, the floor tunnel 15 is configured such that a portion of a substantially horizontal portion on the front side of the plate material constituting the floor tunnel 15; for instance, a portion of the flange 64, extends toward the floor frame 16, and the thus-extending portion is formed into an extending section 67 on the tunnel side.

By lap-joining the extending section 74 of the frame side onto the extending section 74 on the tunnel side by spot welding, or the like, the front side section of the floor frame 16 is joined directly to the front side section of the floor tunnel 15, whereby the floor tunnel 15 and the floor frame 16 can be integrated.

Since the floor tunnel 15 and the floor frame 16 are frame members of the vehicle body 10, plate materials constituting the floor tunnel 15 and the floor frame 16 are greater in thickness than the single floor panel 51. As described hitherto, the above configuration is extremely simple, in that plate materials of large thickness are merely lap-joined, wherein the joint can be formed easily. In addition, weight of the vehicle body 10 can be suppressed.

The left floor frame 16 has a configuration similar to that of the right floor frame 16.

The left floor frame 16 and the left portion of floor tunnel 15 can be joined by use of the same joint structure as that used to join the right floor frame 16 and the right portion of the floor tunnel 15, but are not necessarily joined in the same manner.

Next, a joint structure constituted of rear end sections 75, 75 of the right and left floor frames 16, 16 will be described.

Figure 8:
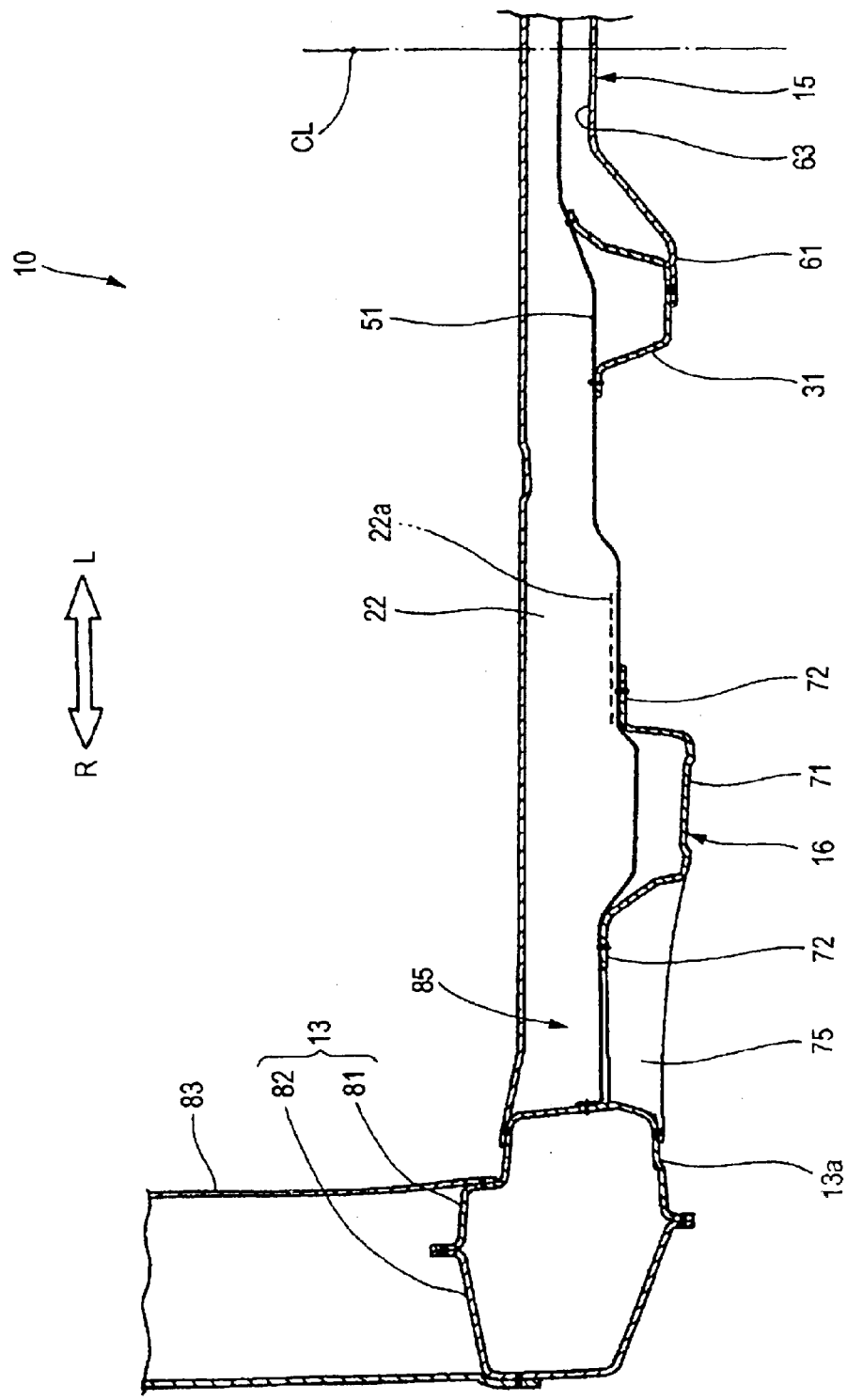
FIG. 8 is a cross-sectional view taken along line 8—8 in FIG. 1.
Figure 9:
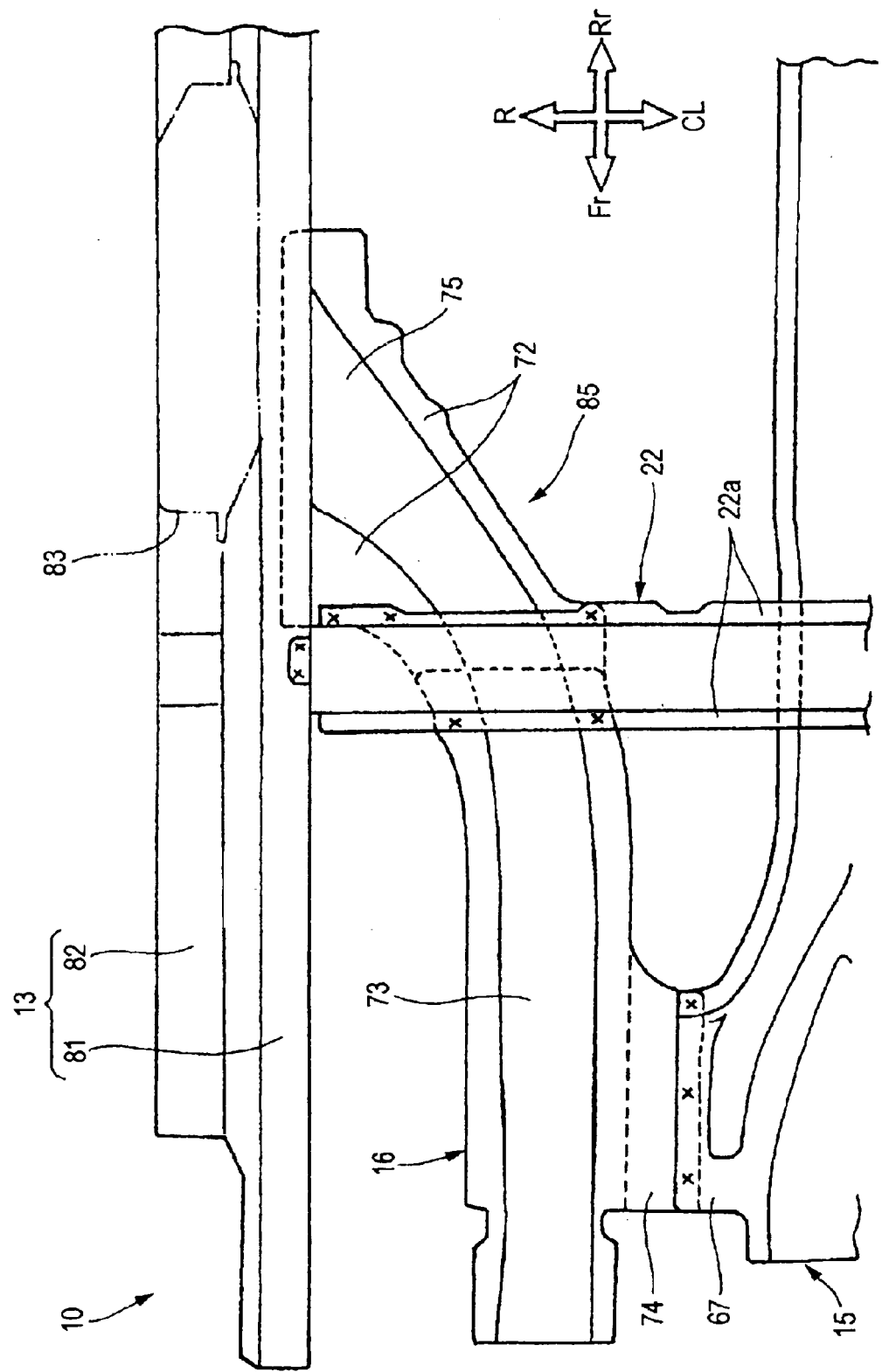
FIG. 9 is a plan view of the essential portions of the vehicle body showing a relationship between a right side sill and the right floor frame of the vehicle body according to the invention.

FIG. 8 is a cross-sectional view taken along line 8—8 in FIG. 1 (however, the drawing shows a state where the floor panel 51 is disposed). FIG. 9 is a plan view of essential portions of the vehicle body showing a relationship between the right side sill 13 and the right floor frame 16 according to the invention, from which the floor panel 51 is omitted.

Figure 10:
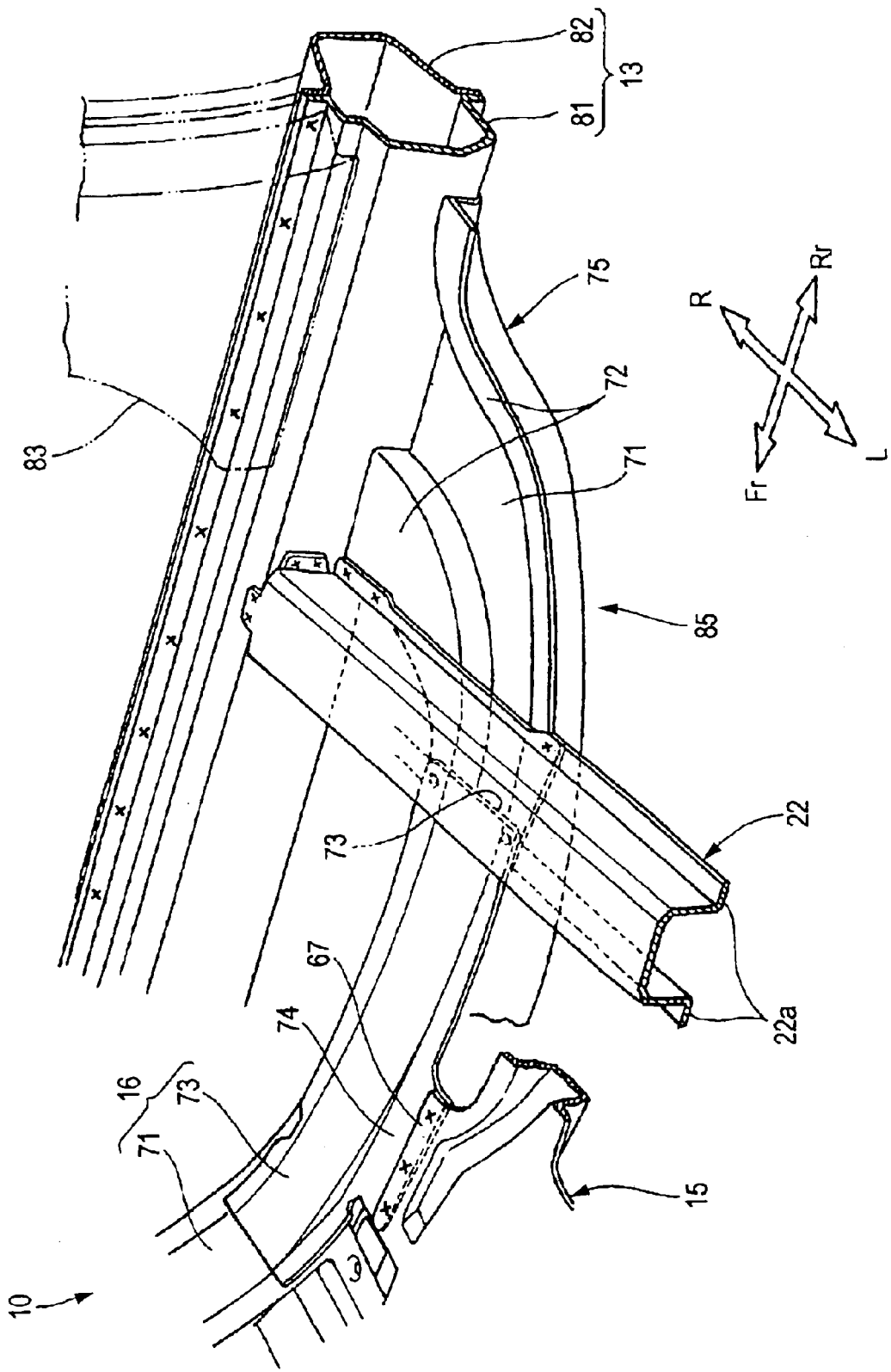
FIG. 10 is a perspective view of the essential portions of the vehicle body showing a relationship between the right side sill and the right floor frame of the vehicle body according to the invention.

FIG. 10 is a perspective view of the essential portions of the vehicle body showing a relationship between the right side sill 13 and the right floor frame 16 according to the invention, from which the floor panel 51 is omitted.

As shown in FIG. 8, the side sill 13 is a closed cross-sectional beam, in which a side sill inner member 81 on the inner side in the lateral direction of the vehicle and a side sill outer member 82 on the outer side in the lateral direction of the vehicle direction are combined. A center pillar 83 extends upward from the side sill 13.

As shown in FIGS. 1 and 9, the vehicle body 10 is configured as follows. The rear end sections 75, 75 of the right and left floor frames 16, 16 are butted to the right and left side sills 13, 13 such that the rear end sections 75, 75 of the floor frames 16, 16 approach the side sills 13, 13, and are joined to the side sills 13, 13 at longitudinal midpoints of the side sills 13, 13. The second cross member 22 spans across the right and left side sills 13, 13 at positions forward of the joint sections and in the vicinity of the joint sections. The rear end sections 75, 75 of the floor frames 16, 16 are also joined to the second cross member 22.

According to the above, the joint section constituted of the left side sill 13, the left floor frame 16, and the second cross member 22 can be configured into a joint structure of substantially triangular shape in plan view; in other words, into a left triangular joint section 85. In addition, the joint section constituted of the right side sill 13, the right floor frame 16, and the second cross member 22 can be configured into a joint structure of substantially triangular shape in plan view; in other words, into a right triangular joint section 85. The side sills 13, 13, the floor frames 16, 16, and the second cross member 22 are capable of complementing each other in terms of rigidity, by virtue of the left and right triangular joint sections 85, 85.

By virtue of the above configuration, sufficient strength and rigidity can be ensured for the vehicle body 10 without the floor frame 16 extending to the rear portion of the vehicle body 10.

Furthermore, when impact energy acts on the front side frame 11 from the front, the impact energy, which is transmitted from the front side frame 11 to the floor frame 16, can be effectively dissipated from the rear end section 75 to the side sill 13 and to the second cross member 22.

More specifically, as shown in FIGS. 8 and 10, the floor frame 16 extends rearward while being reduced in thickness so as to fit along a lower surface 13a (see FIG. 8) of the side sill 13. In other words, the floor frame 16 extends rearward while being tapered. As shown in FIGS. 9 and 10, the rear end section 75 of the floor frame 16 exhibits a diverging shape which curves and becomes wider toward the side sill 13 side when viewed from the top.

The cross-section of the second cross member 22 is of a substantially inverted U shape so as to allow lap-joining onto the floor frame 16 and the center frame 31. The second cross member 22 has flanges 22a, 22a extending substantially horizontally from the lower end thereof. The floor frame 16 and the second cross member 22 can be integrated by lap-joining the flanges 22a, 22a of the second cross member 22 onto the floor frame 16 by spot welding, or the like. Further, the side sill 13 and the second cross member 22 can be integrated by joining a tip section of the second cross member 22 to the side sill 13 by spot welding, or the like.

Next, a joint structure constituted of the floor tunnel 15, the first cross member 21, and the dashboard 41 will be described.

Figure 11:
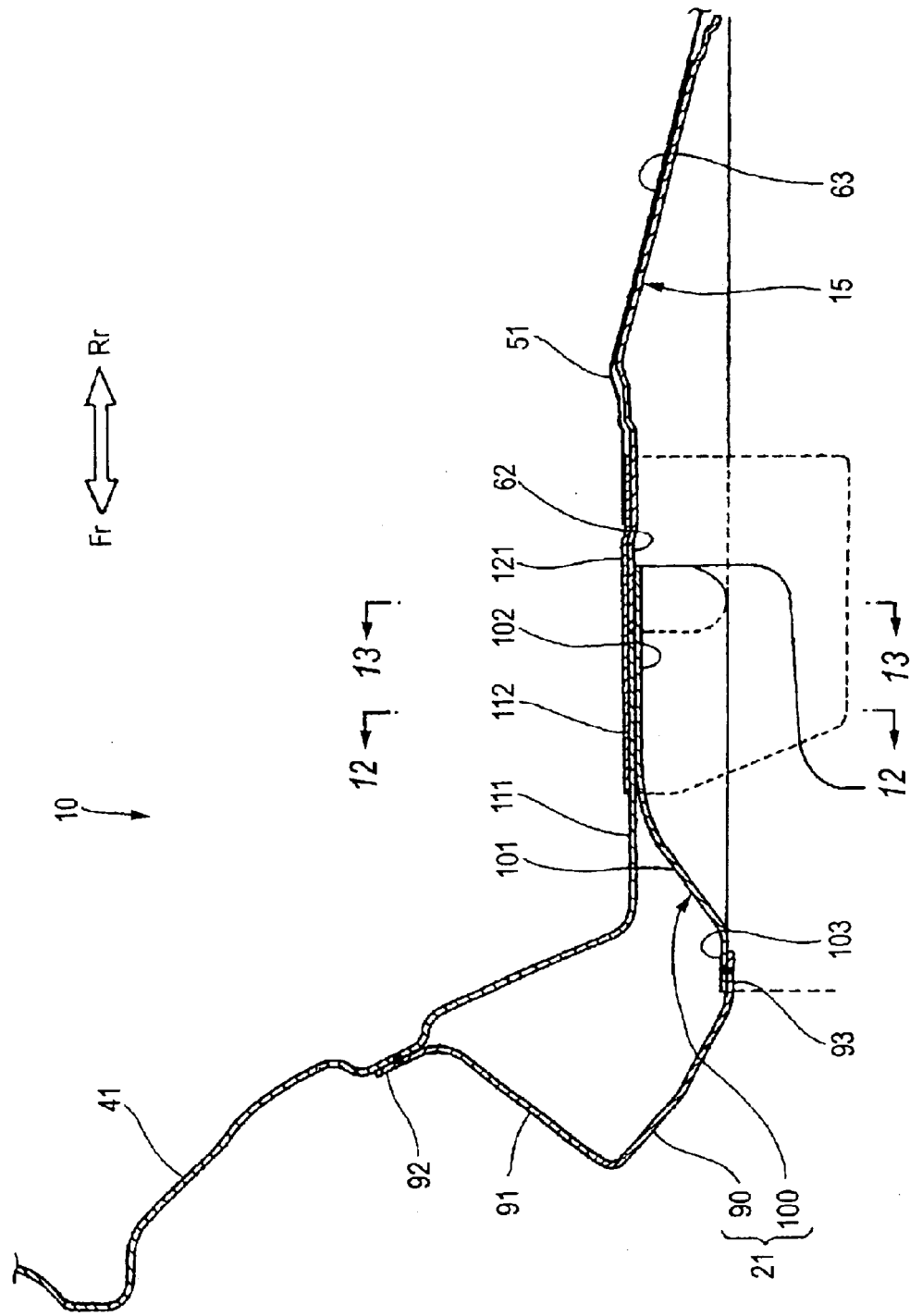
FIG. 11 is a cross-sectional view showing a joint structure of the floor tunnel, a first cross member, and a dashboard of the vehicle body according to the invention.
Figure 12:
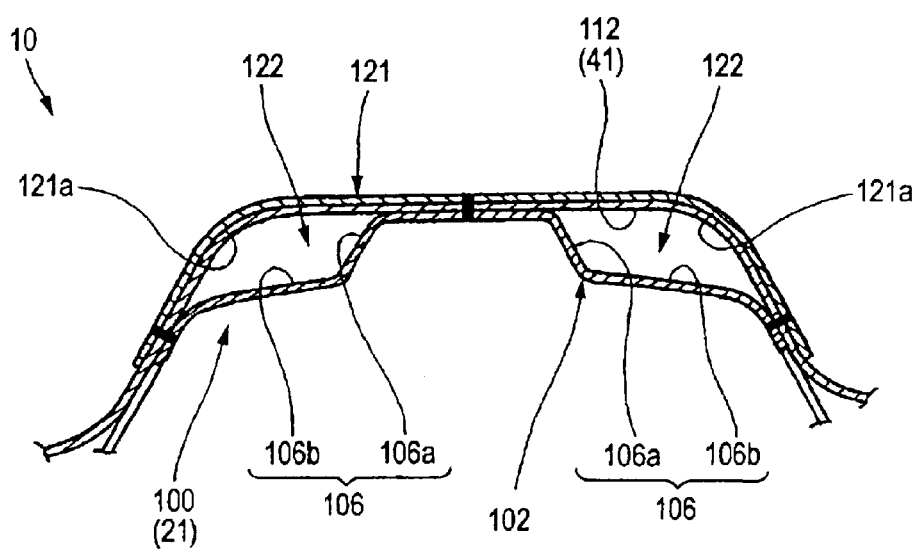
FIG. 12 is a cross-sectional view taken along line 12—12 in FIG. 11.
Figure 13:
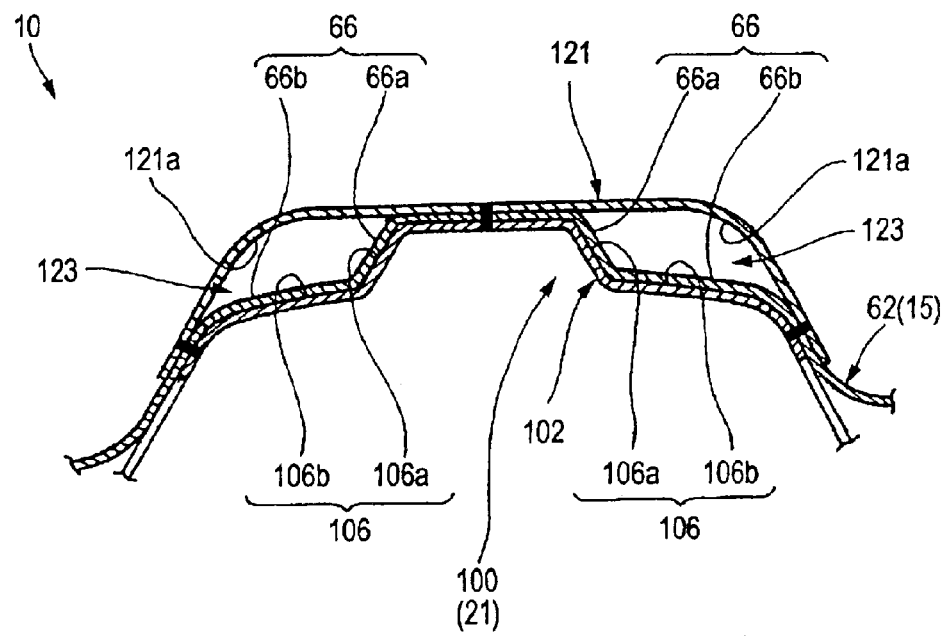
FIG. 13 is a cross-sectional view taken along line 13—13 in FIG. 11.
Figure 14:
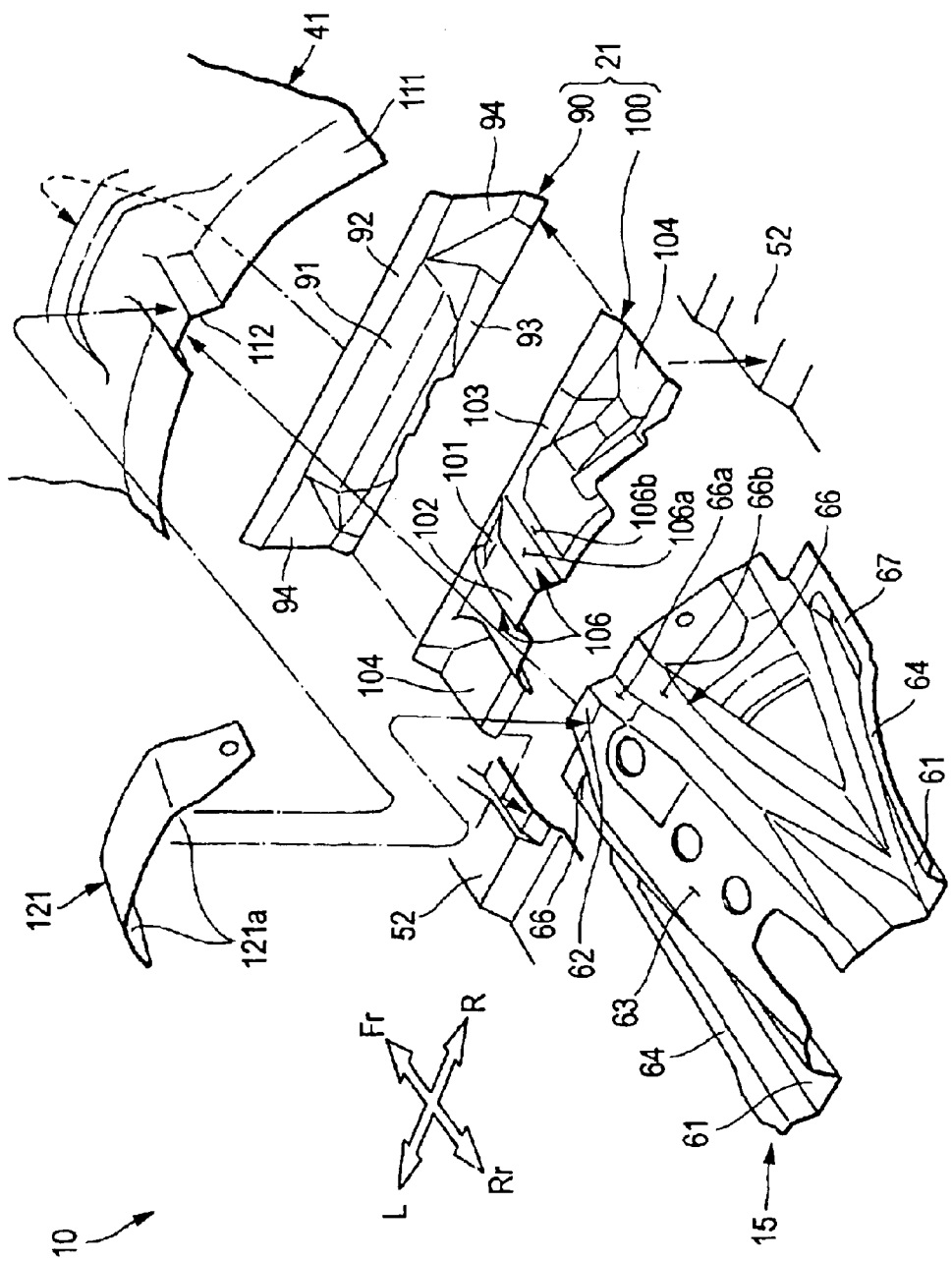
FIG. 14 is an exploded view of the floor tunnel, the first cross member, and the dashboard of the vehicle body according to the invention.
Figure 15:
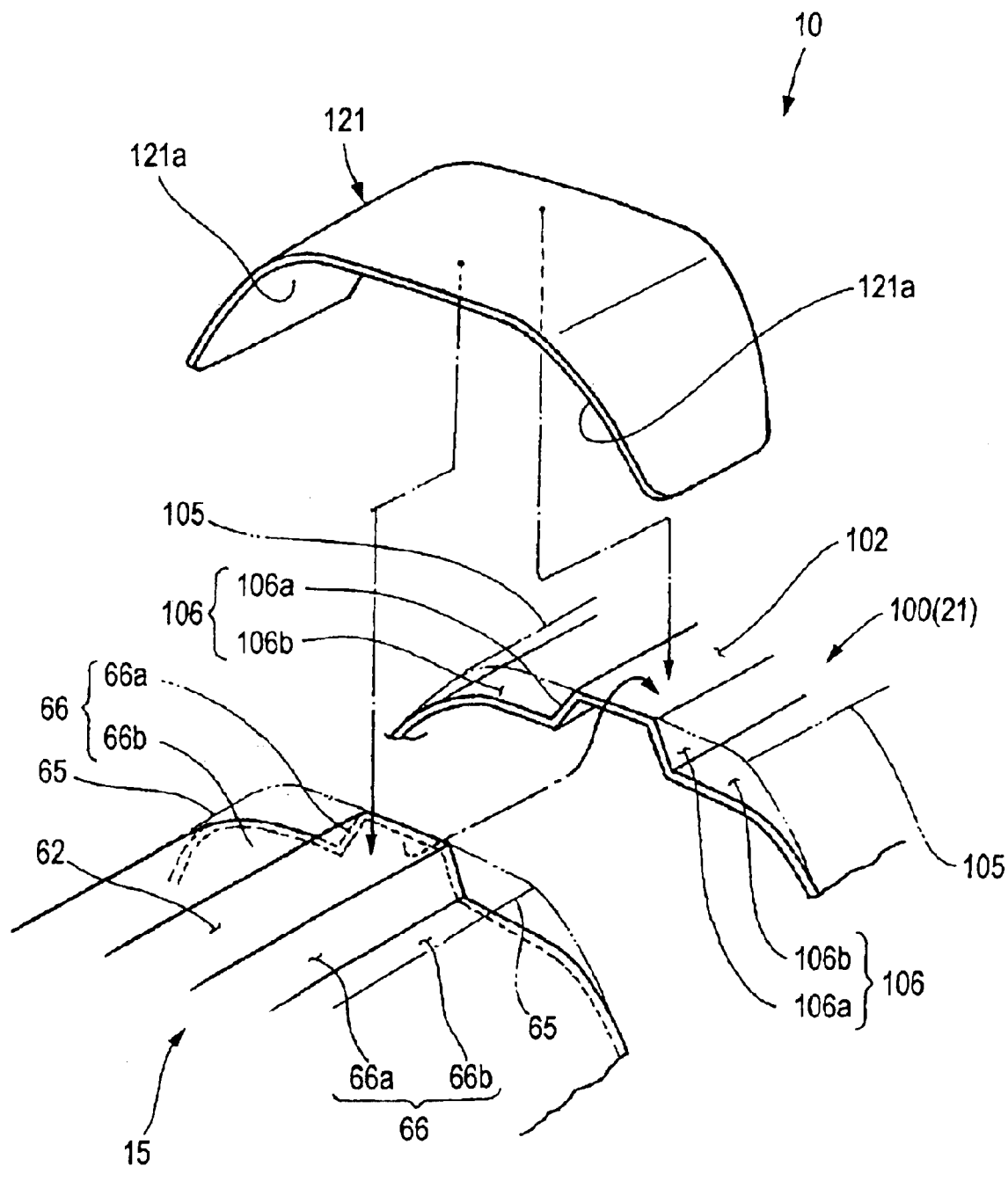
FIG. 15 is an exploded view of the floor tunnel and the first cross member of the vehicle body according to the invention.

FIG. 11 is a cross-sectional view showing the joint structure constituted of the floor tunnel 15, the first cross member 21, and the dashboard 41 according to the invention, showing a cross-sectional structure of the vehicle body along the longitudinal centerline thereof when viewed from the left. FIG. 12 is a cross-sectional view taken along line 12—12 in FIG. 11. FIG. 13 is a cross-sectional view taken along line 13—13 in FIG. 11. FIG. 14 is an exploded view showing the floor tunnel 15, the first cross member 21, and the dashboard 41 according to the invention. FIG. 15 is an exploded view showing the floor tunnel 15 and the first cross member 21 according to the invention.

As shown in FIGS. 11 and 14, the first cross member 21 is constituted of a cross member front-half section 90 and a cross member rear-half section 100. The cross member front-half section 90 and the cross member rear-half section 100 are bent-work products made from plate material elongated in the lateral direction of the vehicle.

The cross member front-half section 90 is constituted of a main body 91 protruding forward and whose cross-section is substantially L-shaped (see FIG. 11); an upper flange 92 extending upward from an upper end of the main body 91 of the L-shaped cross-sectional body; a lower flange 93 extending rearward from a lower end of the main body 91; and side flanges 94, 94 extending laterally from right and left ends of the main body 91.

The cross member rear-half section 100 is constituted of a main body 101 having a substantially inverted U-shaped cross-section when viewed from the back; an extension section 102 extending rearward from the rear end of the main body 101 of the inverted U-shaped cross-sectional body; a front flange 103 extending forward from the front lower end of the main body 101; and side flanges 104, 104 extending laterally from the right and left ends of the main body 101. As with the main body section 101, the extension section 102 has a substantially inverted U-shaped cross section when viewed from the back.

Meanwhile, the dashboard 41 is a plate member in which a lower flange 111 extending rearward on the lower end thereof, and a tunnel section 112 are integrally formed. The tunnel section 112 can be fit over the main body 101 and the extension section 102 of the cross member rear-half section 100 from above at the center of the lower flange 111 in the lateral direction of the vehicle. The tunnel section 112 is a portion having a substantially inverted U-shaped cross section when viewed from the rear.

The first cross member 21 can be integrally provided on the front lower portion of the dashboard 41 by lap-joining the upper flange 92 of the cross member front-half section 90 onto the front surface of the lower portion of the dashboard 41; lap-joining the front flange 103 of the cross member rear-half section 100 onto the lower flange 93 of the cross member front-half section 90; and lap-joining the tunnel section 112 of the dashboard 41 onto the main body section 101 of the cross member rear-half section 100.

The first cross member 21 can be configured into a closed cross-sectional body extending in the lateral direction of the vehicle, by being combined with the dashboard 41. Being a closed cross-sectional body, the first cross member 21 is strong and rigid. In addition, since the dashboard 41 is effectively utilized as a portion of the closed cross-sectional body, weight reduction can also be achieved.

Furthermore, as shown in FIGS. 3, 4, and 14, the first cross member 21 can span across the right and left front side frames 11, 11 by lap-joining the right and side flanges 104, 104 of the cross-member rear-half section 100 onto the right and left brackets 52, 52.

As shown in FIGS. 11 to 14, the extension section 102 and the front end section 62 of the floor tunnel 15 are substantially inverted U-shaped cross-sectional bodies when viewed from the back, and the sizes of the U-shaped cross-sectional bodies are set so as to allow vertically fit-in/fit-over.

The main body 101 and the extension section 102 of the cross member rear-half section 100—in other words, the inverted U-shaped cross-sectional body—include the right and left stepped sections 106, 106 which are formed by forming the right and left upper corners 105, 105 (see FIG. 15) into one-stage lowered steps. The stepped section 106 is constituted of a drooping section 106a extending downward from the upper surface, and a stepped surface section 106b extending laterally from the lower end of the drooping section 106a.

Joint structures constituted of the front end section 62 of the floor tunnel 15, the first cross member 21, and the dashboard 41 are as follows. (1) The front end portion 62 of the floor tunnel 15 is overlapped on the rear-half of the extension section 102, (2) the tunnel section 112 of the dashboard 41 is overlapped onto the main body section 101 of the cross member rear-half portion 100 and the front-half of the extension section 102, (3) the rear end of the tunnel section 112 is butted to the front end of the floor tunnel 15 shown in FIG. 11, (4) a reinforcement member 121 which is of a substantially inverted U shape when viewed from the rear is overlapped on the front end section 62 of the floor tunnel 15 and the tunnel section 112, and (5) the members 62, 102, 111, 112, and 121 are joined by spot welding, or the like. As described above, the front end section 62 is joined to the rear end of the extension section 102.

The reinforcement member 121 is a bent-work product made from plate material, and, as described above, is a doubling plate to be overlapped on both the front end section 62 and the tunnel section 112. The thickness of the reinforcement member 121 is approximately the same as that of the floor tunnel 15, the first cross member 21, and the dashboard 41.

According to the above configuration, impact energy acting from the front of the vehicle body 10 can be effectively transmitted from the front side frames 11, 11 (see FIG. 1) to the first cross member 21, and further transmitted from the extension section 102 of the first cross member 21 to the front end section 62 of the floor tunnel 15. Therefore, impact energy acting from the front of the vehicle body can be effectively and sufficiently dissipated through the entire vehicle body 10. As a result, impact energy can be sufficiently absorbed by the entire vehicle body 10; accordingly, the impact-energy-absorbing ability of the vehicle body 10 can be enhanced.

Meanwhile, during running, vibrations from the front wheels 35, 35 and those from the engine 45 shown in FIG. 1—in other words, vibrations during running—are transmitted from the sub-frame 44 to the first cross member 21 by way of the front side frames 11, 11 and the brackets 52, 52.

To this end, the vibrations can be absorbed not only by the first cross member 21, but also by the floor tunnel 15 be means of being transmitted to the floor tunnel 15 by way of the extension section 102. Therefore, vibration-absorbing ability of the vehicle body 10 can be enhanced.

Furthermore, as shown in FIGS. 11 to 13, and 15, the joint structure of the first cross member 21 is as follows. The reinforcement member 121 is lap-joined onto the extension section 102, the front end section 62, and the tunnel section 112, respectively. As a result, closed cross-sectional sections 122, 122 extending in the longitudinal direction of the vehicle body are formed from right and left upper corners 105, 105 (see FIG. 15) of the extension section 102 and right and left upper corners 121a, 121a of the reinforcement member 121. Further, closed cross-sectional sections 123, 123 extending in the longitudinal direction of the vehicle body are formed from right and left upper corners 65, 65 (see FIG. 15) of the floor tunnel 15 and right and left upper corners 121a, 121a of the reinforcement member 121. Furthermore, the left closed cross-sectional section 122 is connected to the left closed cross-sectional member 123, and the right closed cross-sectional section 122 is connected to the right closed cross-sectional member 123.

As described above, the closed cross-sectional sections 122, 122 extending in the longitudinal direction of the vehicle body are formed on the right and left upper corners 105, 105 (see FIG. 15) of the extension section 102; the closed cross-sectional sections 123, 123 extending in the longitudinal direction of the vehicle body are formed on the right and left upper corners 65, 65 (see FIG. 15) of the floor tunnel 15; and the left close cross-sectional sections 122 and 123 and the right cross-sectional sections 122 and 123 are respectively connected to each other. Accordingly, rigidity of the joint section between the floor tunnel 15 and the extension member 102 can be further enhanced.

By virtue of the above, impact energy acting from the front of the vehicle body 10 can be transmitted from the extension section 102 of the first cross member 21 to the front end section 62 of the floor tunnel 15 with enhanced effectiveness. As a result, the vibration-absorbing ability of the vehicle body 10 can be increased.

Furthermore, since the rigidity of the joint section between the floor tunnel 15 and the extension member 102 has been increased further, vibrations during running can also be absorbed by the high-rigidity section and the floor tunnel 15.

Still furthermore, since the rigidity of the joint section between the floor tunnel 15 and the extension member 102 has been increased further, overall rigidity of the vehicle body 10 can be further increased. As a result, operating stability of the vehicle can be further enhanced.

Next, functions and advantages of the floor tunnel 15 configured according to the above will be described.

Figure 16A:
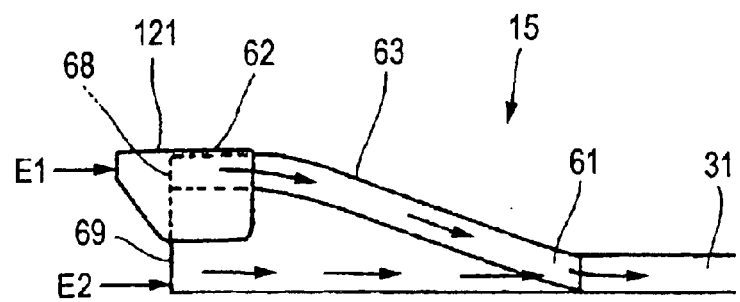
FIGS. 16A to 16C are diagrams illustrating functions of the floor tunnel.
Figure 16B:
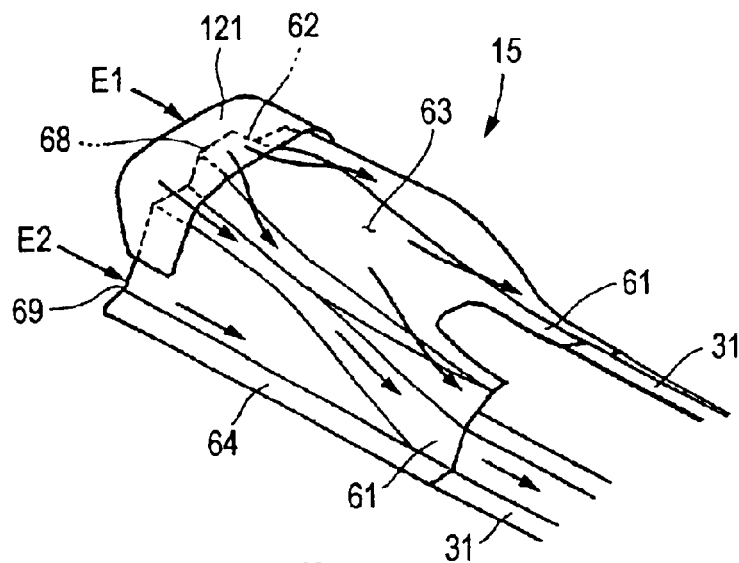
Figure 16C:
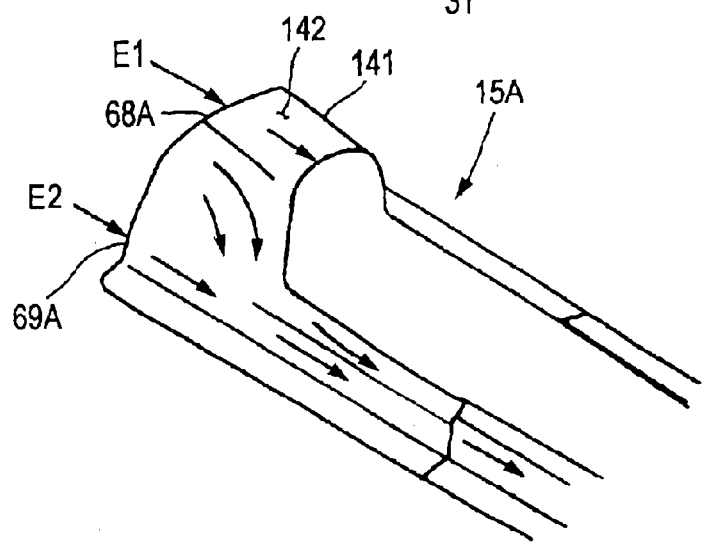

FIGS. 16A to 16C are diagrams illustrating functions of the floor tunnel 15. FIG. 16A shows a constitution of the floor tunnel 15 of the embodiment when viewed from the left. FIG. 16B shows the same when viewed from the upper left. FIG. 16C shows a constitution of a floor tunnel 15A of a comparative example when viewed from the upper left.

The floor tunnel 15A of the comparative example shown in FIG. 16C is configured such that only the front-half section of the floor tunnel 15 is formed into a tunnel section 141 having a substantially vertical rear end. An upper surface 142 of the tunnel section 141 is substantially horizontal.

Upon plastic deformation of the front portion of the vehicle body 10 caused by impact energy acting on the front of the vehicle body 10, which is shown in FIG. 1, the sub-frame 44 attached on the front portion of the vehicle body 10 and the engine 45 mounted on the sub-frame 44 are displaced rearward. Consequently, the rearwardly displaced engine 45 comes into contact with a front upper end 68A of the floor tunnel 15A shown in FIG. 16C, along an upper side. Accordingly, impact energy E1 acts on a front upper end 68. In addition, impact energy E2 acts on a front lower end 69A of the floor tunnel 15A from the rearwardly displaced sub-frame 44 (see FIG. 1), along a lower side.

As described above, impact energy E1 and impact energy E2 are transmitted to the floor tunnel 15 from both the rearwardly displaced engine 45 along an upper side, and the rearwardly displaced sub-frame 44, along a lower side. In this case, effective transmission of the impact energy E1 acting on the front upper end 68A to the rear of the floor tunnel 15 still has room for improvement.

In relation to the above, in the embodiment shown in FIGS. 16A and 16B, the upper surface 63 of the floor tunnel 15 is tilted so as to exhibit a rearward descending grade from the front end section 62. Therefore, when impact energy E1 acts on the front upper end 68 of the floor tunnel 15, the impact energy E1 can be effectively transmitted to the downwardly rearward end of the floor tunnel 15 along the descending grade, and further effectively transmitted to the rear portion of the vehicle body by way of the second and third cross members 22, 23 (see FIG. 1) located rearward.

When the impact energy E2 acts on the front lower end 69 of the floor tunnel 15, the impact energy E2 is effectively transmitted rearward of the floor tunnel 15 as is, and is effectively transmitted further to the rear portion of the vehicle body by way of the second and third cross members 22, 23 (see FIG. 1) located rearward.

In addition, since installation of a member for the purpose of effective transmission of the impact energy E1, E2 from the floor tunnel 15 to the rear portion of the vehicle body is not required, weight of the vehicle body can be suppressed.

Furthermore, since the cabin can be expanded by lowering the rear-half section of the floor tunnel 15 in vertical height, comfort of the cabin can be enhanced.

Next, functions and advantages of the joint structure between the floor tunnel 15 and the floor frame 16 configured according to the above will be described.

Figure 17A:
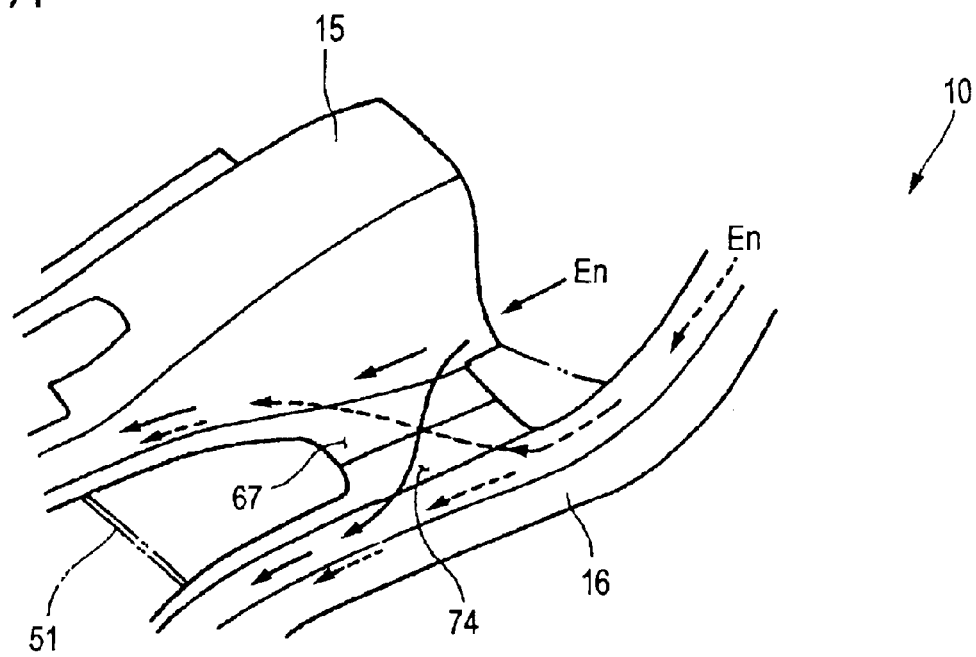
FIGS. 17A and 17B are diagrams illustrating functions of the joint structure between the floor tunnel and the floor frame.
Figure 17B:
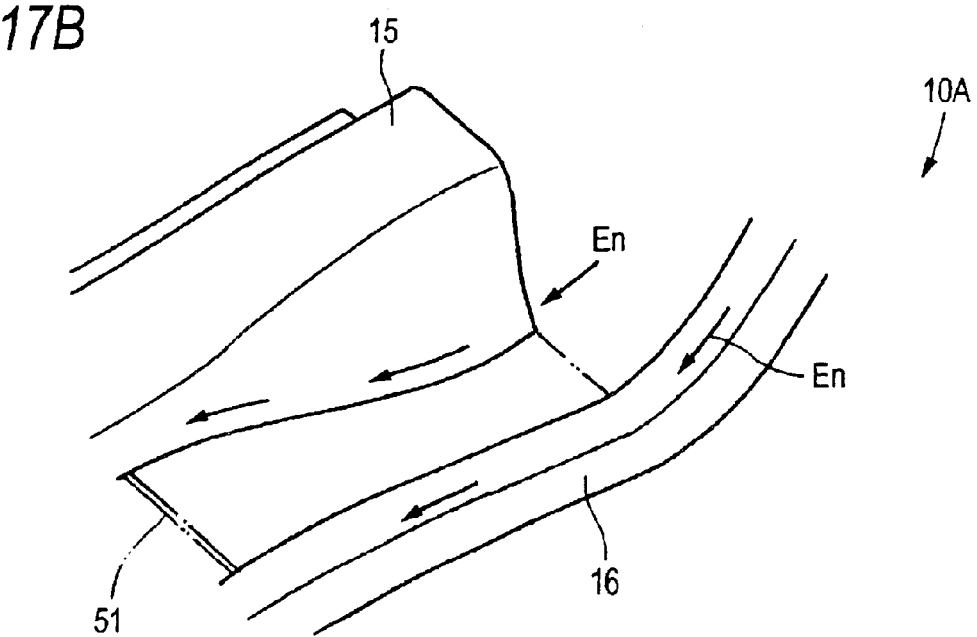

FIGS. 17A and 17B are diagrams illustrating functions of the joint structure between the floor tunnel 15 and the floor frame 16. FIG. 17A shows a constitution of the joint structure between the floor tunnel 15 and the floor frame 16 of the embodiment when viewed from the upper right. FIG. 17B shows a constitution of the floor tunnel 15 and the floor frame 16 of the comparative example when viewed from the upper right.

A vehicle body 10A shown in FIG. 17B is configured such that the floor frame 16 is separated from the floor tunnel 15, and the floor panel 51 connected to the floor tunnel 15 is lap-joined onto the right and left floor frames 16.

When impact energy En acts on the vehicle body 10A from the front, the impact energy En is dissipatedly transmitted to the floor panel 51 by way of the floor frame 16, and is also dissipatedly transmitted from the floor tunnel 15 to the floor panel 51. In such a case, setting the amount of rearward displacement and the amount of plastic deformation of the floor frame 16 so as to be constant in relation to the amount of plastic deformation of the floor tunnel 15 is difficult. Therefore, the floor panel 51 can be deformed between the floor tunnel 15 and the floor frame 16.

In relation to the above, in the embodiment shown in FIG. 17A, the front side section of the floor frame 16 is joined directly to the front side section of the floor tunnel 15. Accordingly, load in the longitudinal direction can be dissipated between the floor tunnel 15 and the floor frame 16, and the same can complement each other in terms of strength and rigidity.

Therefore, when the impact energy En acts on the vehicle body 10 from the front, the impact energy En acting on the floor tunnel 15 can be transmitted directly from the floor tunnel 15 to the floor frame 16 so as to be dissipated. Furthermore, the impact energy En acting on the floor frame 16 can be transmitted directly from the floor frame 16 to the floor tunnel 15 so as to be dissipated. In addition, positional offset between the floor tunnel 15 and the floor frame 16 in the longitudinal direction can be suppressed. As a result, deformation of the floor panel 51 between the floor tunnel 15 and the floor frame 16 can be suppressed. By suppressing deformation of the floor panel 51, a connection of the floor panel 51 to the floor tunnel 15 and the floor frame 16 can be ensured.

Furthermore, the above is configured such that the front side section of the floor frame 16 is joined directly to the front side section of the floor tunnel 15. Accordingly, since no novel joint member is required, configuration of the vehicle body 10 is simple, and weight of the vehicle body 10 can be suppressed.

Next, functions and advantages of the triangular joint section 85 configured according to the above will be described.

Figure 18A:
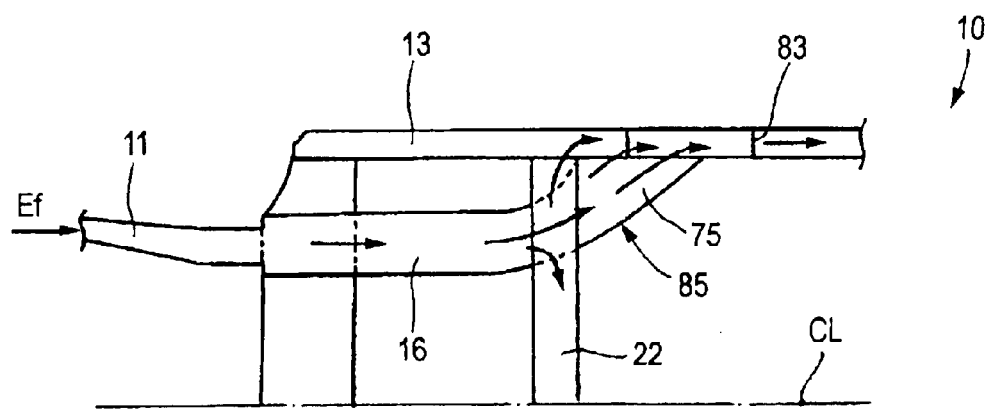
FIGS. 18A to 18C are diagrams illustrating functions of the vehicle body.
Figure 18B:
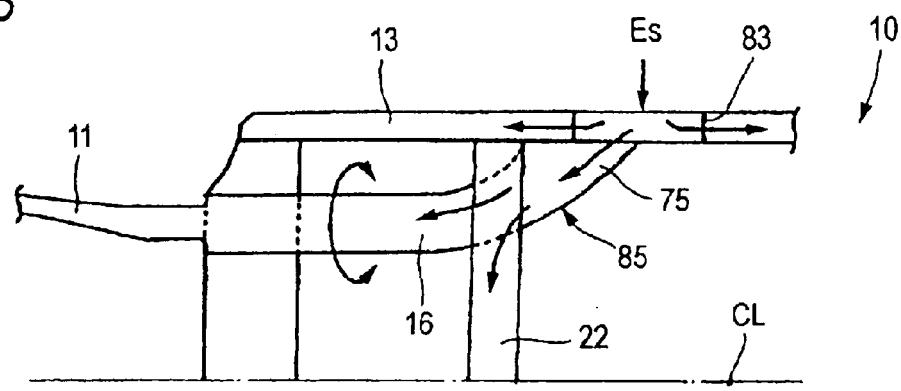
Figure 18C:
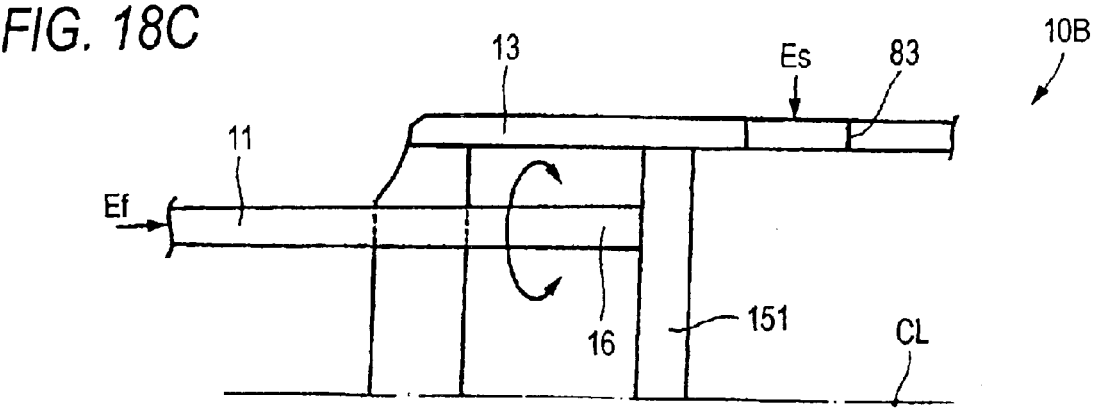
Figure 19:
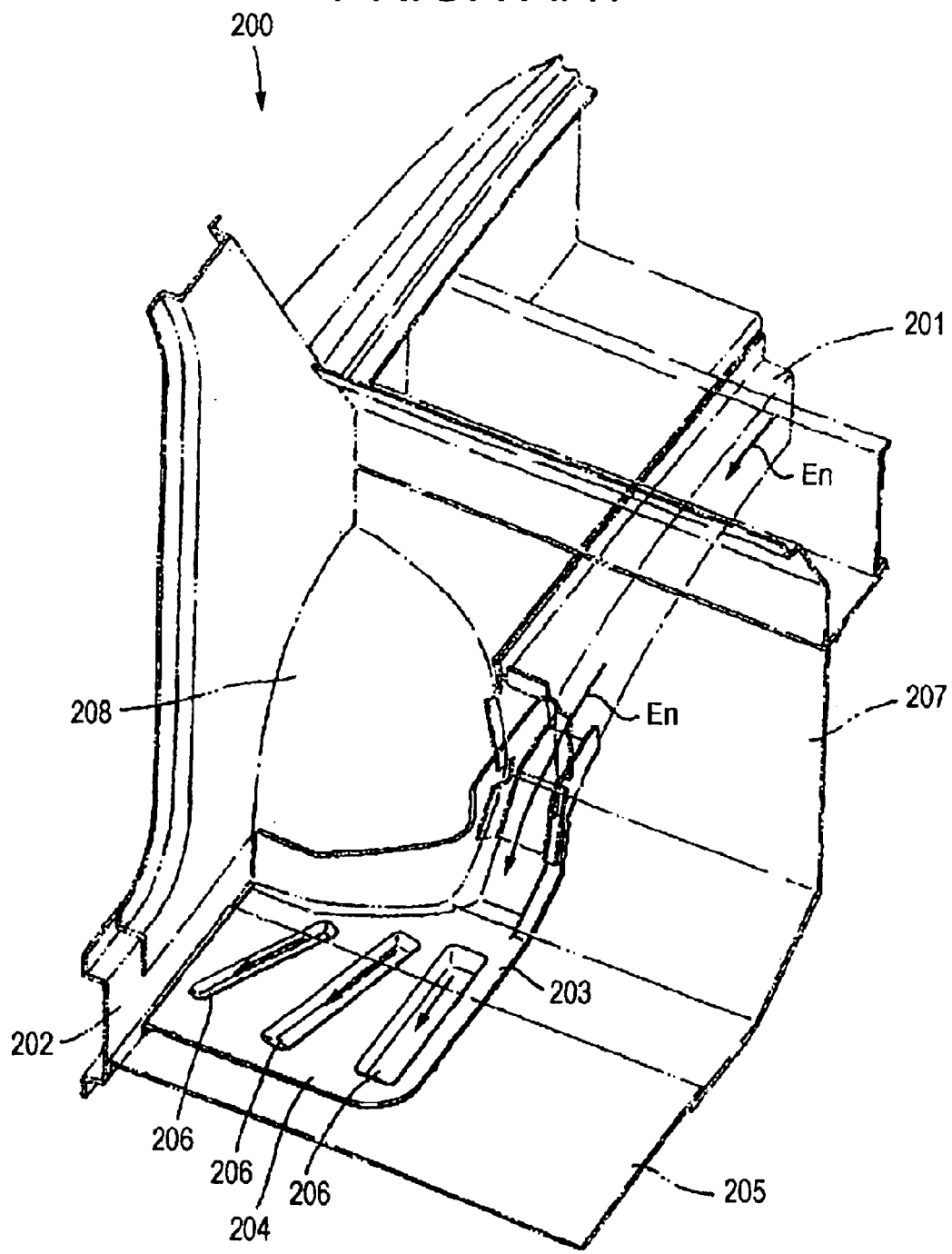
FIG. 19 shows a schematic view of a conventional vehicle body structure.

FIGS. 18A to 18C are diagrams showing functions of the vehicle body. FIG. 18A is a view showing a state where impact energy Ef acts from the front on the vehicle body 10 of the embodiment when viewed from the top. FIG. 18B view showing a state where impact energy Es acts from the side on the vehicle body 10 of the embodiment when viewed from the top. FIG. 18C is a view showing a state where the frontal impact energy Ef and the side impact energy Es act on a vehicle body 10B of the comparative example when viewed from the top.

The vehicle body 10B shown in FIG. 18C is configured as follows. The floor frame 16 (for the sake of simplicity, only one of the floor frames 16 is shown; the same applies hereinafter) and the side sill 13 are disposed in parallel to each other and in the order given from the longitudinal centerline of the vehicle CL. A cross member 151 spans across the right and left side sills 13. The rear end of the floor frame 16 is joined to the cross member 151. The front side frame 11 extends forward from the front end of the floor frame 16.

The impact energy Ef acting on the vehicle body 10B from the front can be transmitted from the front side frame 11 to the cross member 151 by way of the floor frame 16. However, effective dissipation of the impact energy Ef to the side sill 13 perpendicular thereto still has room for improvement.

Meanwhile, the impact energy Es acting on the vehicle body 10B from the side can be transmitted from the side sill 13 to the cross member 151. However, effective dissipation of the impact energy Es to the floor frame 16 perpendicular thereto still has room for improvement.

In relation to the above, in the embodiment shown in FIGS. 18A and 18B, the joint section constituted of the left side sill 13, the left floor frame 16, and the second cross member 22 is configured into a joint structure of substantially triangular shape in plan view; in other words, into the triangular joint section 85. By virtue of constituting the triangular joint section, the side sill 13, the floor frame 16, and the second cross member 22 are capable of complementing each other in terms of strength and rigidity.

As shown in FIG. 18A, the impact energy Ef acting from the front of the vehicle body 10 can be transmitted from the front side frame 11 to the floor frame 16 and further to the triangular joint section 85. Further, the impact energy Ef can be effectively dissipated from the triangular joint section 85 to the second cross member 22 and the side sill 13.

In addition, as shown in FIG. 18B, the impact energy Es acting from the side of vehicle body 10 can be transmitted from the side sill 13 to the triangular joint section 85 by way of the floor frame 16. In the meantime, the impact energy Es can be effectively dissipated from the triangular joint section 85 to the floor fame 16 and the second cross member 22.

As described above, both the impact energy Ef acting from the front of the vehicle body 10 and the impact energy Es acting from the side of the same can be effectively and sufficiently dissipated throughout the entire vehicle body 10. As a result, impact energy Ef and impact energy Es can be sufficiently absorbed by the entire vehicle body 10, and the ability of the vehicle body 10 to absorb the impact energy Es and the impact energy Ef can be enhanced. In addition, there is no need for upsizing members of the vehicle body 10 or disposing novel reinforcement members for the purpose of reinforcing the members. By virtue of the above, weight of the vehicle body 10 can be suppressed and sufficient space can be ensured within the cabin.

Furthermore, as shown in FIG. 18B, vibrations from the front wheels are transmitted to the floor frame 16 by way of the front portion of the vehicle body 10 during running. The vibrations primarily act in a direction for distorting the floor frame 16.

In relation to the above, in the embodiment, the second cross member 22 spans across the right and left side sills 13 at a position forward of the joint section between the side sill 13 and the rear end of the floor frame 16; and the floor frame 16 is also joined to the cross member 22. Accordingly, the floor frame 16 can be shortened in length. Furthermore, the rear end of the floor frame 16 is joined by the robust triangular joint section 85. Therefore, vibrations of the floor frame 16 in the distorting direction can be reduced.

The vehicle body structure of the present invention is suitable for a vehicle having floor frames 16, 16 extending in a longitudinal direction of the vehicle.

What is claimed is:

1. A vehicle body structure comprising:
   right and left floor frames, and right and left side sills, each of said right and left floor frames including a front end section and a rear end section, said front end section of said right and left floor frames extending in parallel with said right and left side sills in a longitudinal direction of a vehicle body,
   right and left front side frames extending forward from front ends of the front end sections of the right and left floor frames, respectively;
   a cross member extending between said right and left side sills, said cross member traversing said right floor frame and said left floor frame, wherein
   a left triangular joint section, which is substantially triangular in plan view, is defined by the left side sill, the left floor frame rear end section, and the cross member;
   a right triangular joint section, which is substantially triangular in plan view, is defined by the right side sill, the right floor frame rear end section, and the cross member;
   the rear end section of the right floor frame extends rearwardly and laterally from the front end section of the right floor frame and the cross member and toward the right side sill and is joined to the right side sill at a substantially longitudinal midpoint of the right side sill;
   the rear end section of the left floor frame extends rearwardly and laterally from the front end section of the left floor frame and the cross member and toward the left side sill and is joined to the left side sill at a substantially longitudinal midpoint of the left side sill; and,
   the cross member is secured to the right and left side sills, said cross member being secured to the right side sill at a location that is forward of the longitudinal midpoint of the right side sill and being secured to the left side sill at a location that is forward of the longitudinal midpoint of the left side sill.

2. The vehicle body structure according to the claim 1, wherein the left floor frame is located between a longitudinal centerline of the vehicle and the left side sill, and wherein the right floor frame is located between the right side sill and the longitudinal centerline of the vehicle.

3. The vehicle body structure of claim 1, wherein a left center pillar extends upwardly from the left side sill and a right center pillar extends upwardly from the right center pillar, and wherein the left and right frame member rear end sections are joined to the left and right side sills, respectively, at locations corresponding to a left and right center pillar of the vehicle.

4. The vehicle body structure according to claim 3, wherein each of the left and right floor frames include a main body and a cover section, said main body being substantially U-shaped in cross-section and said cover section extending over an upwardly facing open end of the main body and thereby defining a closed cross-sectional structure of the frames.

5. The vehicle body structure according to claim 4, wherein the cover section and main body of each of the right and left frames include laterally extending flanges that are welded together to affix the cover section to the main body.

6. The vehicle body structure according to claim 5, wherein the cross member has a generally inverted U-shape in cross-section and includes flanges at a lower end thereof, said cross member flanges extending longitudinally forward and rearward and being lap-joined to the right and left floor frames.

7. The vehicle body structure according to claim 1, wherein said cross member traverses said right floor frame at an intersection of said right floor frame front end section and said right floor frame rear end section, and wherein said cross member traverses said left floor frame at an intersection of said left floor frame front end section and said left floor frame rear end section.

8. The vehicle body structure according to the claim 7, wherein the left floor frame is located between a longitudinal centerline of the vehicle and the left side sill and the right floor frame is located between the right side sill and the longitudinal centerline of the vehicle.

9. The vehicle body structure of claim 7, wherein a left center pillar extends upwardly from the left side sill and a right center pillar extends upwardly from the right center pillar, and wherein the left and right frame member rear end sections are joined to the left and right side sills, respectively, at locations corresponding to a left and right center pillar of the vehicle.

10. The vehicle body structure according to claim 9, wherein each of the left and right floor frames include a main body and a cover section, said main body being substantially U-shaped in cross-section and said cover section extending over an upwardly facing open end of the main body and thereby defining a closed cross-sectional structure of the frames.

11. The vehicle body structure according to claim 10, wherein the cover section and main body of each of the right and left frames include laterally extending flanges that are welded together to affix the cover section to the main body.

12. The vehicle body structure according to claim 11, wherein the cross member has a generally inverted U-shape in cross-section and includes flanges at a lower end thereof, said cross member flanges extending longitudinally forward and rearward and being lap-joined to the right and left floor frames.

* * * * *